US010286794B2

(12) United States Patent
Ichikawa

(10) Patent No.: US 10,286,794 B2
(45) Date of Patent: May 14, 2019

(54) VEHICLE

(75) Inventor: Shinji Ichikawa, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 503 days.

(21) Appl. No.: 14/397,574

(22) PCT Filed: May 9, 2012

(86) PCT No.: PCT/JP2012/061831
§ 371 (c)(1),
(2), (4) Date: Oct. 28, 2014

(87) PCT Pub. No.: WO2013/168242
PCT Pub. Date: Nov. 14, 2013

(65) Prior Publication Data
US 2015/0123465 A1    May 7, 2015

(51) Int. Cl.
*H02J 17/00* (2006.01)
*B60L 11/18* (2006.01)
(Continued)

(52) U.S. Cl.
CPC .............. *B60L 11/182* (2013.01); *B60K 1/04* (2013.01); *B60L 11/14* (2013.01); *B60L 11/1824* (2013.01); *B60L 11/1833* (2013.01); *B60L 11/1861* (2013.01); *B60L 11/1877* (2013.01); *B60L 11/1887* (2013.01); *H01F 38/14* (2013.01); *H02J 7/0042* (2013.01); *H02J 17/00* (2013.01); *H02J 50/12* (2016.02); *H02J 50/40* (2016.02); *H04B 5/0037* (2013.01); *H04B 5/0075* (2013.01); *B60K 2001/0422* (2013.01); *B60L 2210/10* (2013.01); *B60L 2210/30* (2013.01); *B60L 2210/40* (2013.01); *B60L 2250/16* (2013.01); *H04W 4/046* (2013.01); *H04W 4/40* (2018.02); *Y02T 10/70* (2013.01); *Y02T 10/705* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 90/12* (2013.01);
(Continued)

(58) Field of Classification Search
USPC .......................................................... 307/9.1
See application file for complete search history.

(56) References Cited

U.S. PATENT DOCUMENTS 7,741,734 B2   6/2010   Joannopoulos et al.
2007/0222542 A1   9/2007   Joannopoulos et al.
(Continued)

FOREIGN PATENT DOCUMENTS

AU   2006269374 B2   1/2007
AU   2006269374 C1   1/2007
(Continued)

*Primary Examiner* — Rexford Barnie
*Assistant Examiner* — Xuan Ly
(74) *Attorney, Agent, or Firm* — Sughrue Mion, PLLC

(57) ABSTRACT

A vehicle includes: a power reception unit that receives electric power contactlessly from a power transmission unit externally provided; and an electronic device. The power reception unit includes a coil formed to surround a winding axis. Assuming that a region extending in a direction in which the winding axis extends from the coil when viewing the coil from above the vehicle is an adjacent region, the electronic device is away from the adjacent region.

1 Claim, 30 Drawing Sheets

(51) Int. Cl.

| | | |
|---|---|---|
| *H02J 50/12* | (2016.01) | |
| *H02J 50/40* | (2016.01) | |
| *B60L 11/14* | (2006.01) | |
| *H02J 7/00* | (2006.01) | |
| *H01F 38/14* | (2006.01) | |
| *H04B 5/00* | (2006.01) | |
| *B60K 1/04* | (2019.01) | |
| *H04W 4/40* | (2018.01) | |
| *H04W 4/04* | (2009.01) | |

(52) U.S. Cl.
CPC ............ *Y02T 90/121* (2013.01); *Y02T 90/122* (2013.01); *Y02T 90/125* (2013.01); *Y02T 90/127* (2013.01); *Y02T 90/14* (2013.01); *Y02T 90/34* (2013.01)

(56) References Cited

U.S. PATENT DOCUMENTS

| | | | |
|---|---|---|---|
| 2008/0265684 A1* | 10/2008 | Farkas | B60L 11/005 307/104 |
| 2008/0278264 A1 | 11/2008 | Karalis et al. | |
| 2009/0045773 A1* | 2/2009 | Pandya | B60L 5/005 320/108 |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0084658 A1 | 4/2011 | Yamamoto | |
| 2011/0273025 A1 | 11/2011 | Amano et al. | |
| 2011/0309790 A1 | 12/2011 | Sasaki | |
| 2012/0169135 A1* | 7/2012 | Yamamoto | B60L 11/182 307/104 |
| 2012/0318586 A1 | 12/2012 | Atarashi | |
| 2013/0037365 A1 | 2/2013 | Ichikawa | |
| 2013/0320759 A1* | 12/2013 | Abe | H01F 38/14 307/10.1 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| DE | 102010027640 A1 | 1/2012 |
| DE | 102010044999 * | 3/2012 |
| DE | 102010044999 A1 | 3/2012 |
| EP | 1 902 505 A2 | 3/2008 |
| EP | 2 130 287 A1 | 12/2009 |
| EP | 2179880 * | 4/2010 |
| EP | 2179880 A1 | 4/2010 |
| IN | 735/DELNP/2008 A | 5/2008 |
| IN | 6195/DELNP/2009 A | 7/2010 |
| JP | 2006-054958 A | 2/2006 |
| JP | 2008288889 * | 11/2008 |
| JP | 2008288889 A | 11/2008 |
| JP | 2009-501510 T | 1/2009 |
| JP | 2010-172084 A | 8/2010 |
| JP | 2010-183812 A | 8/2010 |
| JP | 2010-246348 A | 10/2010 |
| JP | 2011-049230 A | 3/2011 |
| JP | 2011-097671 A | 5/2011 |
| JP | 2011-193671 A | 9/2011 |
| KR | 10-2008-0031398 A1 | 4/2008 |
| KR | 10-2010-0015954 A | 2/2010 |
| KR | 10-2011-0053490 A | 5/2011 |
| WO | 2007/008646 A2 | 1/2007 |
| WO | 2008/118178 A1 | 10/2008 |
| WO | 2010/058477 A1 | 5/2010 |
| WO | 2011/108403 A1 | 9/2011 |
| WO | 2012014038 A2 | 2/2012 |
| WO | 2013/168239 A1 | 11/2013 |
| WO | 2013/168240 A1 | 11/2013 |
| WO | 2013/168241 A1 | 11/2013 |

* cited by examiner

VEHICLE

CROSS REFERENCE TO RELATED APPLICATIONS

This application is a National Stage of International Application No. PCT/JP2012/061831, filed May 9, 2012, the contents of all of which are incorporated herein by reference in their entirety.

TECHNICAL FIELD

The present invention relates to a vehicle capable of contactlessly receiving electric power.

BACKGROUND ART

In recent years, due to concerns with environment, attention has been drawn to a hybrid vehicle, an electric vehicle, and the like, each of which drives driving wheels using electric power from a battery or the like.

Particularly drawing attention in recent years is wireless charging, by which such a battery included in an electrically powered vehicle can be charged contactlessly without using a plug or the like. Recently, various types of charging methods have been proposed with regard to the contactless charging methods. Particularly, a technique of contactlessly transferring electric power using a resonance phenomenon is receiving attention.

For example, a vehicle described in each of Japanese Patent Laying-Open No. 2010-172084 and Japanese Patent Laying-Open No. 2011-49230 includes a primary side core and a primary side coil wound around the primary side core.

Also, a vehicle described in Japanese Patent Laying-Open No. 2011-193671 includes a power reception unit that receives electric power from a power transmission unit provided externally.

CITATION LIST

Patent Document

PTD 1: Japanese Patent Laying-Open No. 2010-172084
PTD 2: Japanese Patent Laying-Open No. 2011-49230
PTD 3: Japanese Patent Laying-Open No. 2011-193671

SUMMARY OF INVENTION

Technical Problem

The above-described vehicle generally includes a plurality of electronic devices. When transferring electric power between the power transmission unit and the power reception unit, an electromagnetic field is generated around the power reception unit.

Accordingly, depending on a relative positional relation between the electronic device and the power reception unit, the electronic devices will be greatly affected by the electromagnetic field formed around the power reception unit.

The present invention has been made in the foregoing problem, and has an object to provide a vehicle allowing an electronic device in the vehicle to be less affected during transfer of electric power between a power transmission unit and a power reception unit.

Solution to Problem

A vehicle according to the present invention includes: a power reception unit that receives electric power contactlessly from a power transmission unit externally provided; and an electronic device. The power reception unit includes a coil formed to surround a winding axis. A region in which the electronic device is disposed is positioned in a direction different from a direction in which the winding axis extends from the coil. Preferably, an opening is formed at an end portion of the coil. Assuming that a region extending in the direction in which the winding axis extends from the opening of the coil when viewing the coil from above the vehicle is an adjacent region, the electronic device is disposed in a region different from the adjacent region.

Preferably, the electronic device provided at the position away from the adjacent region is one of a battery capable of storing electric power, a PCU (Power Control Unit) connected to the battery, and a rotating electrical machine connected to the PCU.

Preferably, the coil is disposed such that the winding axis extends in a width direction of the vehicle. The electronic device is disposed at a front side or a rear side of the vehicle relative to the coil. Preferably, the vehicle further includes an adjacent device at least having a portion disposed in the adjacent region when viewed from above the vehicle. The number of electronic components included in the adjacent device is less than the number of electronic components included in the electronic device.

Preferably, the electronic device includes a battery capable of storing electric power. The adjacent device has one of an accumulation portion, a first connection portion, and a second connection portion, the accumulation portion being capable of accumulating energy other than electric power, the first connection portion being connected to the accumulation portion, a supply unit supplying the energy being connected to the first connection portion, the second connection portion being connected to the battery, a power feeding unit supplying electric power being connected to the second connection portion.

Preferably, the coil is disposed such that the winding axis extends in a horizontal direction. Preferably, the winding axis includes a first winding axis and a second winding axis different in direction from the first winding axis. The coil includes a first coil and a second coil, the first coil being formed to surround the first winding axis, the second coil being formed to surround the second winding axis. The adjacent region includes a first adjacent region and a second adjacent region, the first adjacent region extending in a direction in which the second winding axis extends from the first coil, the second adjacent region extending as the second winding axis extends from the second coil. Preferably, a difference in natural frequency between the power transmission unit and the power reception unit is equal to or less than 10% of the natural frequency of the power reception unit.

Preferably, a coupling coefficient between the power reception unit and the power transmission unit is equal to or less than 0.1. Preferably, the power reception unit receives electric power from the power transmission unit through at least one of a magnetic field and an electric field, the magnetic field being formed between the power reception unit and the power transmission unit and oscillating at a specific frequency, the electric field being formed between the power reception unit and the power transmission unit and oscillating at the specific frequency.

In another aspect, a vehicle according to the present invention includes: a power reception unit including a coil that receives electric power contactlessly from a power transmission unit externally provided; and an electronic device. An electromagnetic field formed by transfer of electric power between the power reception unit and the power transmission unit is distributed more widely from the coil in a second direction than in a first direction, the second direction being different from the first direction. The electronic device is disposed in a region in a direction different from the second direction from the coil.

Advantageous Effects of Invention

According to the vehicle in the present invention, the electronic device provided in the vehicle can be less affected by the electromagnetic field resulting from the transfer of electric power.

DESCRIPTION OF EMBODIMENTS

First Embodiment

Figure 1:
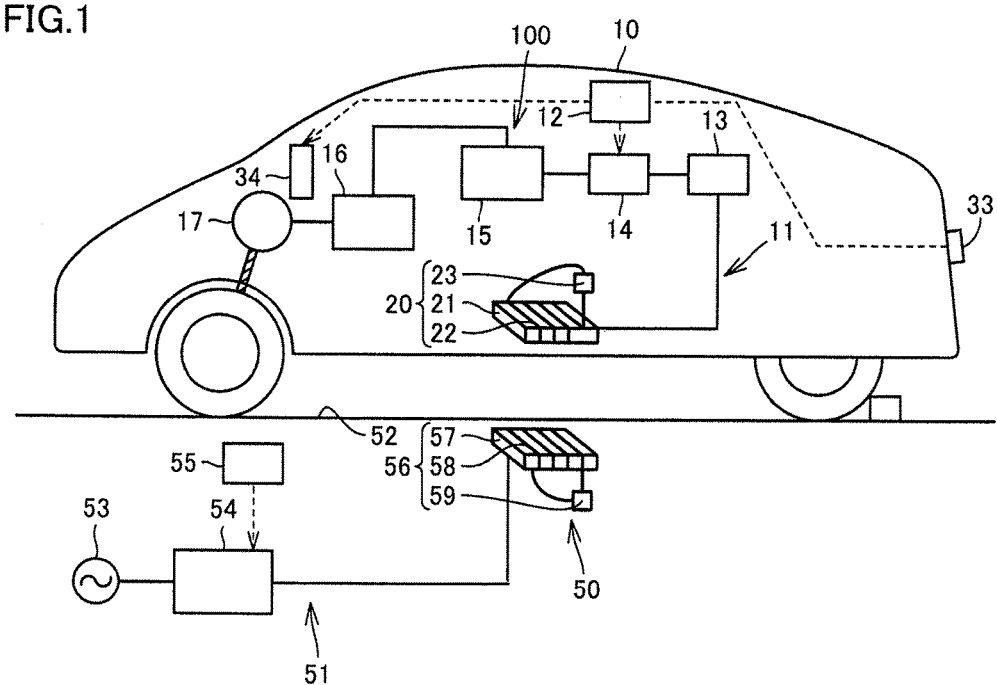
FIG. 1 is a schematic view schematically showing a power reception device, a power transmission device, and a power transfer system according to the present embodiment.

FIG. 1 is a schematic view schematically showing a power reception device, a power transmission device, and a power transfer system according to a first embodiment.

The power transfer system according to the first embodiment includes: an electrically powered vehicle 10 including a power reception device 11; and an external power feeding device 51 including a power transmission device 50. Power reception device 11 of electrically powered vehicle 10 receives electric power from power transmission device 50 when parked in a predetermined position of a parking space 52 provided with power transmission device 50.

Parking space 52 is provided with a sprag as well as lines indicating a parking position and a parking range such that electrically powered vehicle 10 is parked at the predetermined position.

External power feeding device 51 includes: a high-frequency power driver 54 connected to an AC power supply 53; a control unit 55 that controls driving of high-frequency power driver 54 or the like; and power transmission device 50 connected to this high-frequency power driver 54. Power transmission device 50 includes a power transmission unit 56. Power transmission unit 56 includes: a ferrite core 57; a primary coil (resonance coil) 58 wound around ferrite core 57; and a capacitor 59 connected to this primary coil 58. It is to be noted that capacitor 59 is not an essential configuration. Primary coil 58 is connected to high-frequency power driver 54. It is to be noted that primary coil 58 and capacitor 59 may be connected in parallel with high-frequency power driver 54, and primary coil 58 and capacitor 59 may be connected in series with high-frequency power driver 54.

Power transmission unit 56 includes an electric circuit formed by inductance of primary coil 58, stray capacitance of primary coil 58, and capacitance of capacitor 59.

In FIG. 1, electrically powered vehicle 10 includes power reception device 11 and an electric device module 100. Electric device module 100 includes: a rectifier 13 connected to power reception device 11; a DC/DC converter 14 connected to rectifier 13; a battery 15 connected to DC/DC converter 14; a power control unit (PCU) 16; a motor unit 17 connected to power control unit 16; a vehicle ECU (Electronic Control Unit) 12 that controls driving of DC/DC converter 14, power control unit 16, and the like; a camera 33; and a display unit 34. Electric device module 100 includes a plurality of electronic devices as described above. It is to be noted that the components included in electric device module 100 and exemplified herein are: the power reception electronic device including rectifier 13 and converter 14; and the hybrid electronic device including battery 15, power control unit 16, and motor unit 17. Inclusion of other electronic devices is not excluded. Examples thereof include: a door opening/closing sensor that senses opening/closing of a door; a load sensor that senses a load applied to a seat; and the like. It is to be also noted that the electronic devices included in electric device module 100 also include an interconnection.

It is to be noted that electrically powered vehicle 10 according to the present embodiment is a hybrid vehicle including an engine not shown in the figures, but includes a fuel cell vehicle and an electric vehicle as long as they are vehicles driven by a motor.

Rectifier 13, which is connected to power reception device 11, converts alternating current supplied from power reception device 11 into direct current, and supplies it to DC/DC converter 14.

DC/DC converter 14 adjusts the voltage of the direct current supplied from rectifier 13, and supplies it to battery 15. It is to be noted that DC/DC converter 14 is not an essential configuration and may be omitted. In such a case, DC/DC converter 14 can be replaced with a matching device provided between power transmission device 50 and high-frequency power driver 54 to match the impedance with external power feeding device 51.

Power control unit 16 includes a converter connected to battery 15 and an inverter connected to this converter, and the converter adjusts (boosts) the direct current supplied from battery 15 and supplies it to the inverter. The inverter converts the direct current supplied from the converter into alternating current, and supplies it to motor unit 17.

For motor unit 17, a three-phase alternating current motor or the like is employed, for example. Motor unit 17 is driven using the alternating current supplied from the inverter of power control unit 16.

It is to be noted that electrically powered vehicle 10 further includes an engine or a fuel cell. Motor unit 17 includes: a motor generator that mainly functions as a power generator; and a motor generator that mainly functions as a motor. Camera 33 captures an image of power transmission unit 56 provided at the ground surface side, and sends the captured information to vehicle ECU 12. Vehicle ECU 12 displays the image captured by camera 33 on display unit 34.

Power reception device 11 includes a power reception unit 20. Power reception unit 20 includes: a ferrite core 21; a secondary coil 22 wound around the outer circumferential surface of ferrite core 21; and a capacitor 23 connected to secondary coil 22. Also in power reception unit 20, capacitor 23 is not an essential configuration. Secondary coil 22 is connected to rectifier 13. It is to be noted that capacitor 23 and secondary coil 22 may be connected to rectifier 13 in parallel with each other, and capacitor 23 and secondary coil 22 may be connected to rectifier 13 in series with each other. Secondary coil 22 has stray capacitance. Accordingly, power reception unit 20 has an electric circuit formed by inductance of secondary coil 22 and capacitances of secondary coil 22 and capacitor 23. It is to be noted that capacitor 23 is not an essential configuration and can be omitted.

Figure 2:
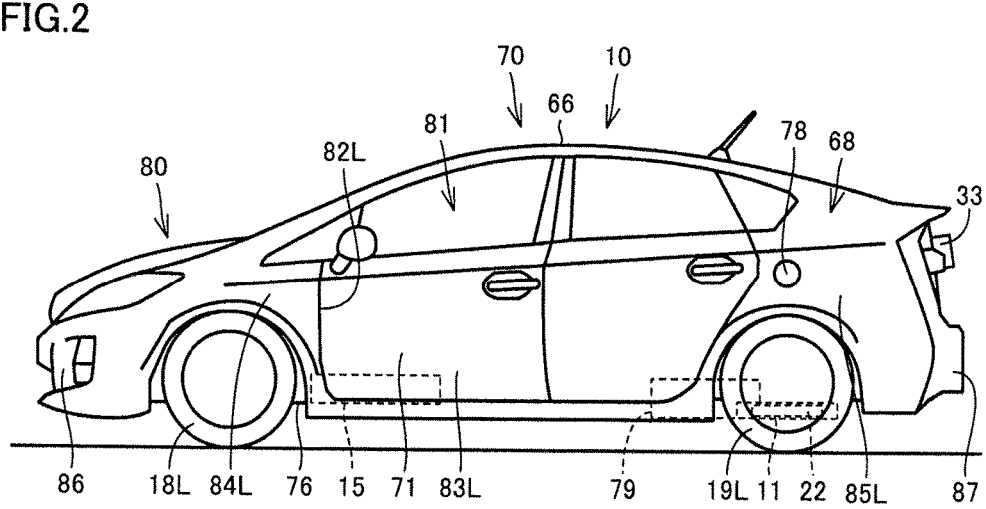
FIG. 2 is a side view showing the left side surface of electrically powered vehicle 10.
Figure 3:
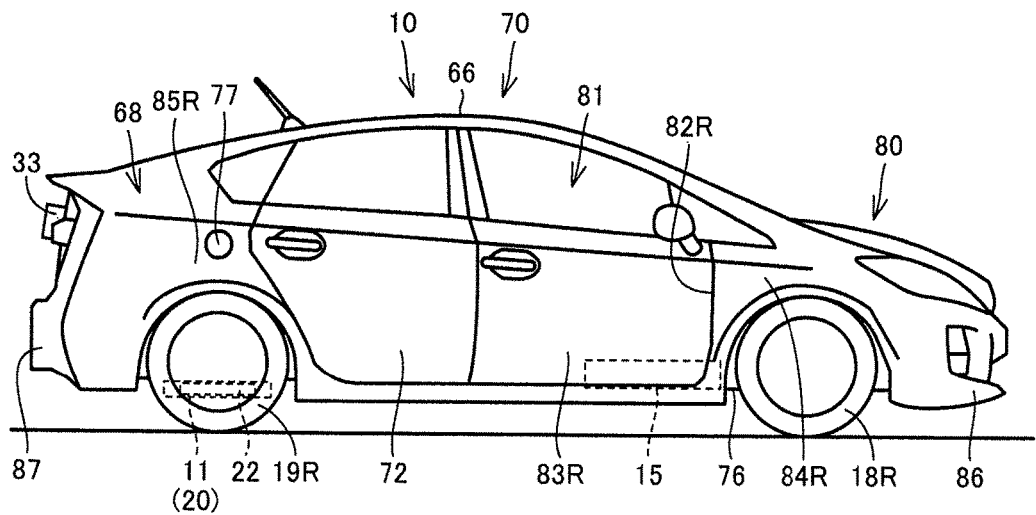
FIG. 3 is a side view showing the right side surface of electrically powered vehicle 10.
Figure 4:
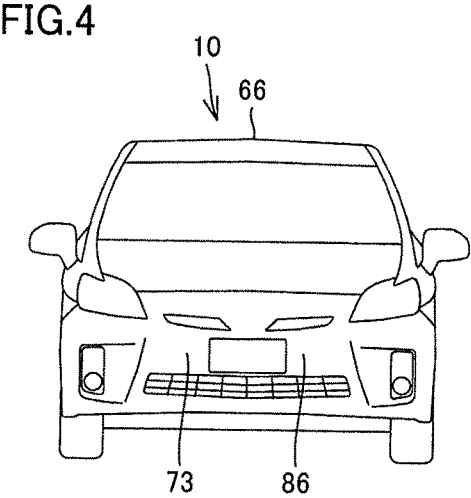
FIG. 4 is a front view of electrically powered vehicle 10.
Figure 5:
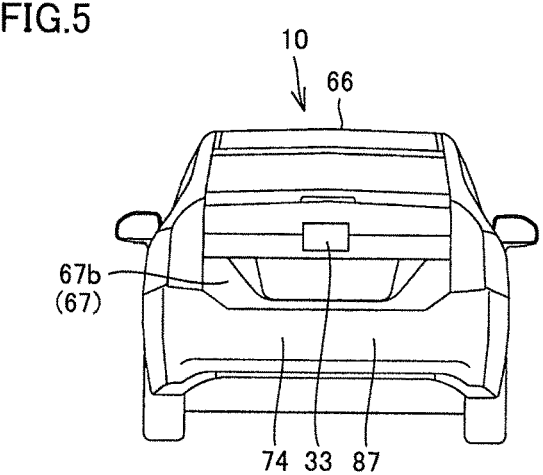
FIG. 5 is a rear view of electrically powered vehicle 10.
Figure 6:
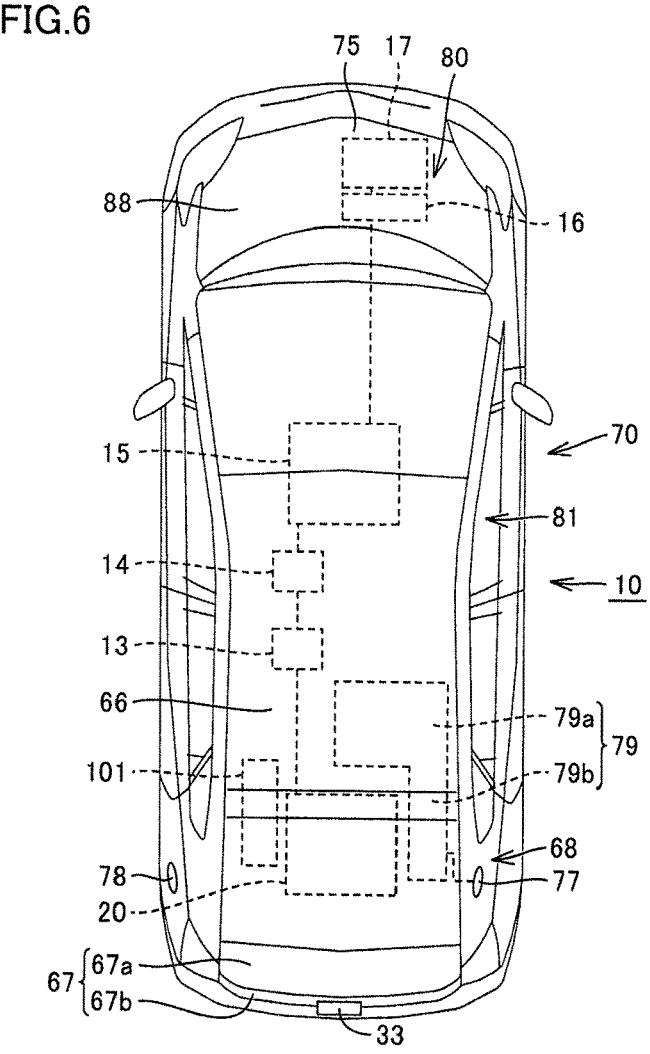
FIG. 6 is a plan view of electrically powered vehicle 10.
Figure 7:
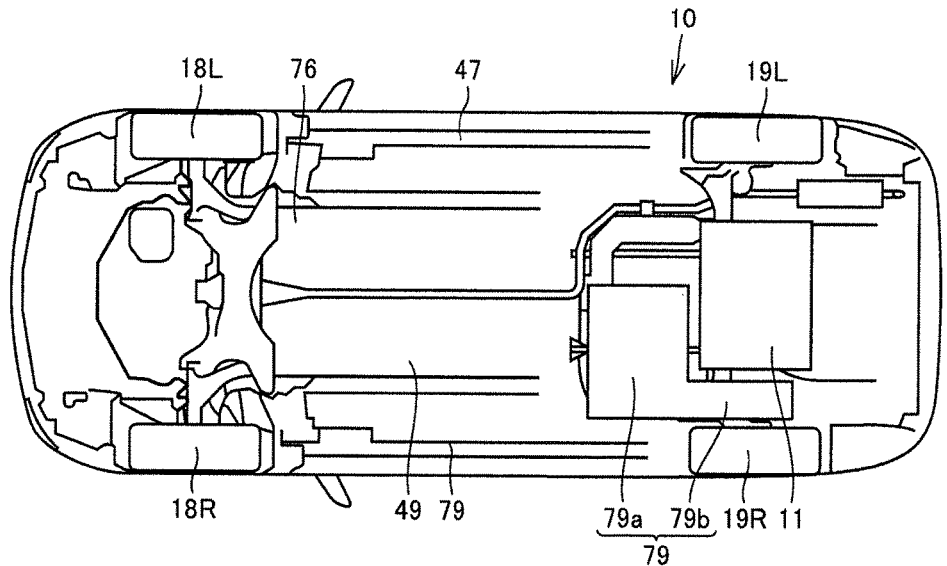
FIG. 7 is a bottom view of electrically powered vehicle 10.

FIG. 2 is a side view showing the left side surface of electrically powered vehicle 10. FIG. 3 is a side view showing the right side surface of electrically powered vehicle 10. FIG. 4 is a front view of electrically powered vehicle 10. FIG. 5 is a rear view of electrically powered vehicle 10. FIG. 6 is a plan view of electrically powered vehicle 10. FIG. 7 is a bottom view of electrically powered vehicle 10.

In FIG. 2, electrically powered vehicle 10 includes a vehicle main body 70 and a front wheel 18L and a rear wheel 19L provided in vehicle main body 70. Formed in vehicle main body 70 are: a driving compartment 80 having motor unit 17, the engine, and the like contained therein; a passenger compartment 81 disposed at a rear side relative to driving compartment 80 in the traveling direction of electrically powered vehicle 10; and a luggage compartment 68 disposed at a rear side relative to passenger compartment 81 in the traveling direction.

In left side surface 71 of electrically powered vehicle 10, a boarding opening 82L is formed to communicate with passenger compartment 81. Vehicle main body 70 includes: a door 83L that opens/closes boarding opening 82L; a front fender 84L disposed at a front side relative to boarding opening 82L in the traveling direction; and a front bumper 86 disposed at a front side relative to front fender 84 in the traveling direction.

Vehicle main body 70 includes: a rear fender 85L disposed at a rear side relative to boarding opening 82L in the traveling direction; and a rear bumper 87 disposed at a rear side relative to rear fender 85L in the travelling direction.

In FIG. 3, in right side surface 72 of electrically powered vehicle 10, a boarding opening 82R is formed to communicate with passenger compartment 81. Vehicle main body 70 includes: a door 83R that opens/closes boarding opening 82R; a front fender 84R disposed at a front side relative to boarding opening 82R in the traveling direction; and a rear fender 85R disposed at a rear side relative to boarding opening 82R in the traveling direction. In FIG. 6, vehicle main body 70 includes: an engine roof 88 that opens/closes driving compartment 80; a roof 66 that defines the upper surface of passenger compartment 81; and a hatch 67 that opens/closes an opening formed in luggage compartment 68. Hatch 67 includes an upper surface portion 67*a* and a rear surface portion 67*b*.

Left side surface 71 of electrically powered vehicle 10 is a surface that is in the width direction of electrically powered vehicle 10 and that can be seen when electrically powered vehicle 10 is viewed from a position away from electrically powered vehicle 10 leftward as shown in FIG. 2.

Hence, left side surface 71 of electrically powered vehicle 10 is mainly defined by the side portion of front bumper 86, front fender 84L, door 83L, rear fender 85L, and the side portion of rear bumper 87.

In FIG. 3, right side surface 72 of electrically powered vehicle 10 is a surface that is in the width direction of electrically powered vehicle 10 and that can be seen when electrically powered vehicle 10 is viewed from a position away from electrically powered vehicle 10 rightward as shown in FIG. 3. Hence, right side surface 72 of electrically powered vehicle 10 is mainly defined by the side portion of front bumper 86, front fender 84R, door 83R, rear fender 85R, and the side portion of rear bumper 87.

In FIG. 4, front surface 73 of electrically powered vehicle 10 is a surface that can be seen when electrically powered vehicle 10 is viewed from a position away from electrically powered vehicle 10 forwardly in the traveling direction.

Accordingly, front surface 73 of electrically powered vehicle 10 is mainly defined by the front surface portion of front bumper 86 and members provided between engine roof 88 and front bumper 86.

In FIG. 5, rear surface 74 of electrically powered vehicle 10 is a surface that can be seen when electrically powered vehicle 10 is viewed from a position away from electrically powered vehicle 10 backwardly in the traveling direction.

Accordingly, rear surface 74 of electrically powered vehicle 10 is mainly defined by the rear surface portion of rear bumper 87 and rear surface portion 67*b* of hatch 67.

In FIG. 6, upper surface 75 of electrically powered vehicle 10 is a surface that can be seen when electrically powered vehicle 10 is viewed from a position away upwardly in a direction perpendicular to the ground in a state such that the tires of electrically powered vehicle 10 are in contact with the ground.

Accordingly, upper surface 75 of electrically powered vehicle 10 is mainly defined by engine roof 88, roof 66, and upper surface portion 67*a* of hatch 67.

In FIG. 7, bottom surface 76 of electrically powered vehicle 10 is a surface that can be seen when electrically powered vehicle 10 is viewed from a position away downwardly in the direction perpendicular to the ground in a state such that the tires of electrically powered vehicle 10 are in contact with the ground. Power reception device 11 is provided at the bottom surface 76 side of electrically powered vehicle 10. Various types of methods can be employed to fix power reception device 11. For example, electrically powered vehicle 10 may include: side members 47 arranged in the width direction of the vehicle; and a plurality of cross members provided to connect side members 47 to each other, power reception device 11 being suspended from side members 47 and the cross members. Alternatively, electrically powered vehicle 10 includes a floor panel 49, and power reception device 11 may be fixed to this floor panel 49. Regarding the expression "power reception device 11 is disposed at the bottom surface 76 side", power reception device 11 does not need to be necessarily provided at a position that can be visually seen when electrically powered vehicle 10 is viewed from below electrically powered vehicle 10.

Figure 8:
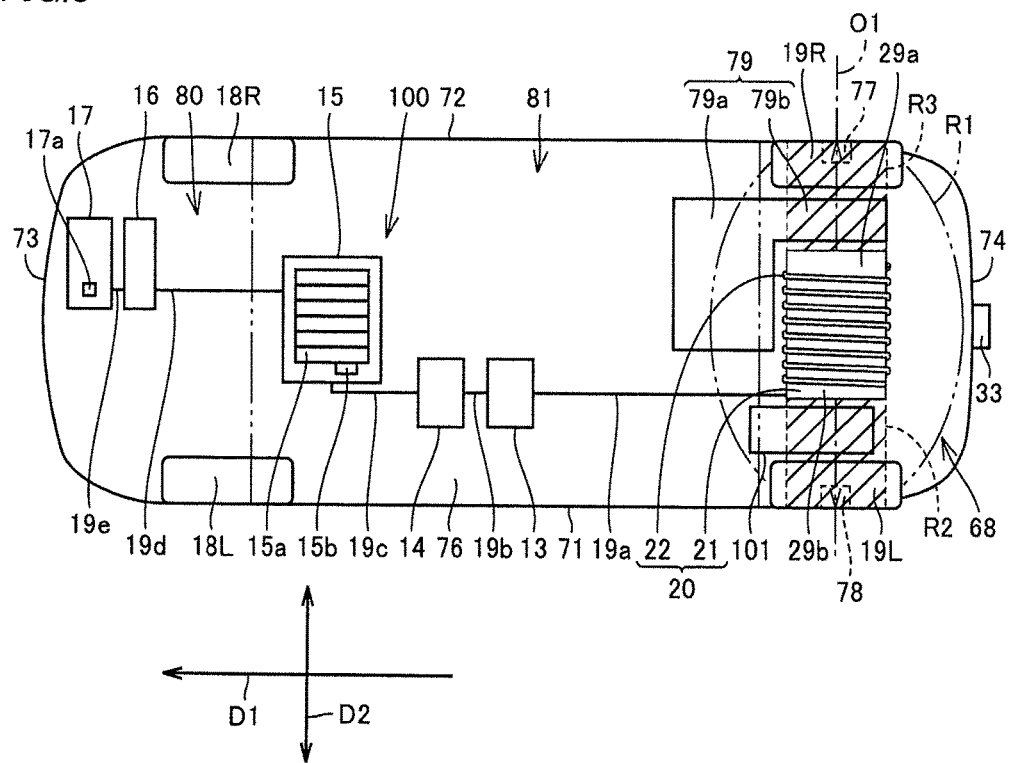
FIG. 8 is a plan view schematically showing electrically powered vehicle 10 when viewing electrically powered vehicle 10 from above electrically powered vehicle 10.

FIG. 8 is a plan view schematically showing electrically powered vehicle 10 when electrically powered vehicle 10 is viewed from above electrically powered vehicle 10.

In FIG. 8, electrically powered vehicle 10 includes: a refueling portion (second connection portion) 77 provided in right side surface 72; a charging portion (first connection portion) 78 provided in left side surface 71; and a fuel tank 79 connected to refueling portion 77 via a pipe or the like. As devices adjacent to power reception unit 20, electrically powered vehicle 10 includes refueling portion 77, charging portion 78, and fuel tank 79. In the present specification, the term "connection portion" is intended to mean at least one of refueling portion (connection portion) 77 and charging portion (connection portion) 78.

In the present embodiment, refueling portion 77 is provided at rear fender 85L and charging portion 78 is provided at rear fender 85R.

Refueling portion 77 is connected to a refueling plug provided in a refueling device. The refueling plug (fuel supply unit) supplies fuel such as gasoline or liquid hydrogen to refueling portion 77, and the fuel supplied to refueling portion 77 is supplied to fuel tank 79. Thus, energy supplied from refueling portion 77 is energy different from electric power and is fuel such as gasoline or a hydrogen compound including hydrogen element. Charging portion 78 is connected to battery 15. Between charging portion 78 and battery 15, an interconnection and a transducer, which converts alternating current supplied from charging portion 78 into direct current, are provided. A charging plug provided in a charging device is connected to charging portion 78. The charging plug (power supply unit) supplies electric power to charging portion 78. Alternating current, which is supplied to charging portion 78, is converted into direct current and is accumulated in battery 15.

Power reception unit 20 is provided in bottom surface 76 at a portion below luggage compartment 68. Fuel tank 79 includes: a main body portion 79*a* provided at the front side of electrically powered vehicle 10 relative to power reception unit 20; and an auxiliary tank portion 79*b* extending from main body portion 79*a* into between rear wheel 19R and power reception unit 20. Rectifier 13 is disposed at the front side of electrically powered vehicle 10 relative to power reception unit 20. Converter 14 is disposed at the front side of electrically powered vehicle 10 relative to power reception unit 20. Battery 15 is provided at the front side of electrically powered vehicle 10 relative to power reception unit 20. Power control unit 16 and motor unit 17 are also disposed at the front side relative to power reception unit 20.

Power reception unit 20 and rectifier 13 are connected to each other by an interconnection 19*a*. Rectifier 13 and converter 14 are connected to each other by an interconnection 19*b*. Converter 14 and battery 15 are connected to each other by an interconnection 19*c*. Moreover, battery 15 and power control unit 16 are connected to each other by an interconnection 19*d*, and power control unit 16 and motor unit 17 are connected to each other by an interconnection 19*e*. Camera 33 is provided in rear surface 74 at the rear portion of electrically powered vehicle 10 relative to power reception unit 20.

Figure 9:
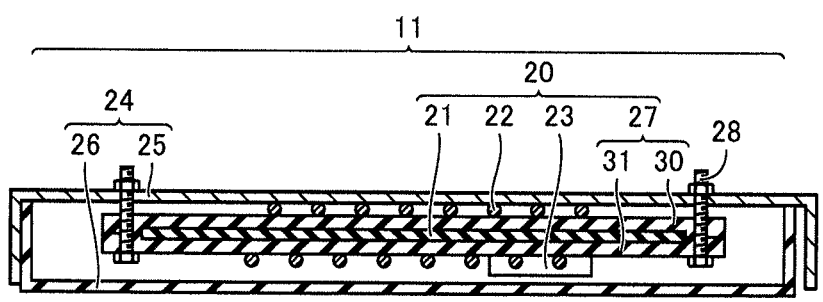
FIG. 9 is a cross sectional view showing power reception device 11.
Figure 10:
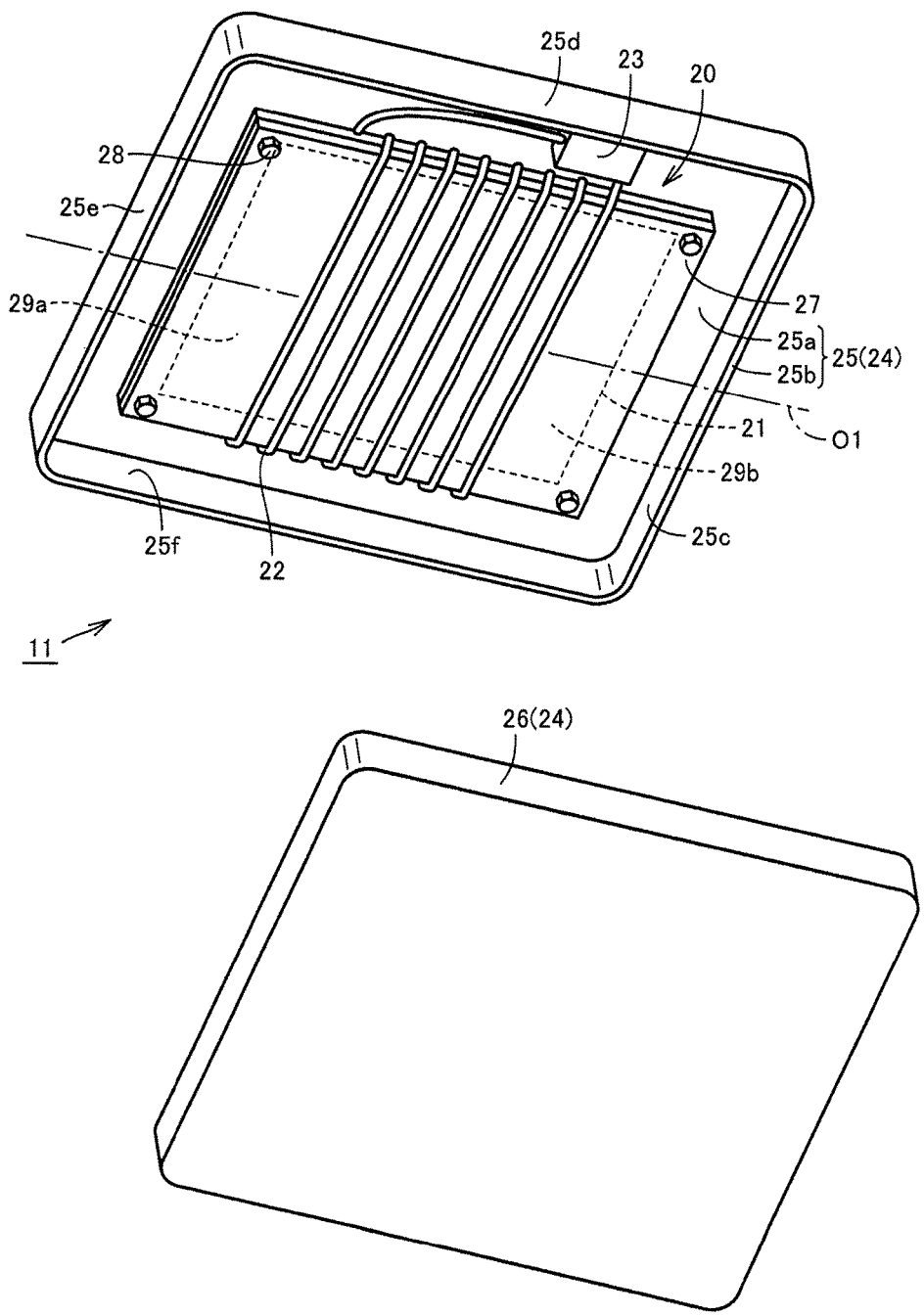
FIG. 10 is an exploded perspective view of power reception device 11.

FIG. 9 is a cross sectional view showing power reception device 11, and FIG. 10 is an exploded perspective view of power reception device 11. As shown in FIG. 9 and FIG. 10, power reception device 11 includes power reception unit 20 and a case 24 having power reception unit 20 accommodated therein.

Case 24 includes: a shield 25 formed to open downwardly; and a cover portion 26 provided to close the opening of shield 25.

Shield 25 includes: a top plate portion 25*a*; and a circumferential wall portion 25*b* formed to extend downwardly from the circumferential edge portion of top plate portion 25*a*. Circumferential wall portion 25*b* includes a plurality of wall portions 25*c* to 25*f*, and the plurality of wall portions 25*c* to 25*f* are connected to one another to form annular circumferential wall portion 25*b*. Wall portion 25*c* and wall portion 25*e* are arranged in a direction in which winding axis O1 of secondary coil 22 extends, whereas wall portion 25*d* and wall portion 25*f* are arranged in a direction perpendicular to winding axis O1 of secondary coil 22. It is to be noted that the shape of shield 25 is not limited to such a shape and various types of shapes can be employed such as a polygonal shape, a circular shape, and an oval shape.

The bottom end portion of circumferential wall portion 25*b* forms an opening, which is closed by cover portion 26.

Power reception unit 20 includes: a ferrite core 21 formed to have a plate-like shape; a fixation member 27 that sandwiches ferrite core 21 from the upper and lower sides; a secondary coil 22 wound around fixation member 27; and a capacitor 23 connected to secondary coil 22.

Ferrite core 21 includes a protrusion portion 29*a* and a protrusion portion 29*b*, each of which protrudes from the inside of secondary coil 22 in the direction in which winding axis O1 extends. Protrusion portion 29*a* protrudes from one end side of secondary coil 22, whereas protrusion portion 29*b* protrudes from the other end side of secondary coil 22. Thus, ferrite core 21 is formed to be longer than the length of secondary coil 22 in the direction in which winding axis O1 extends.

Figure 11:
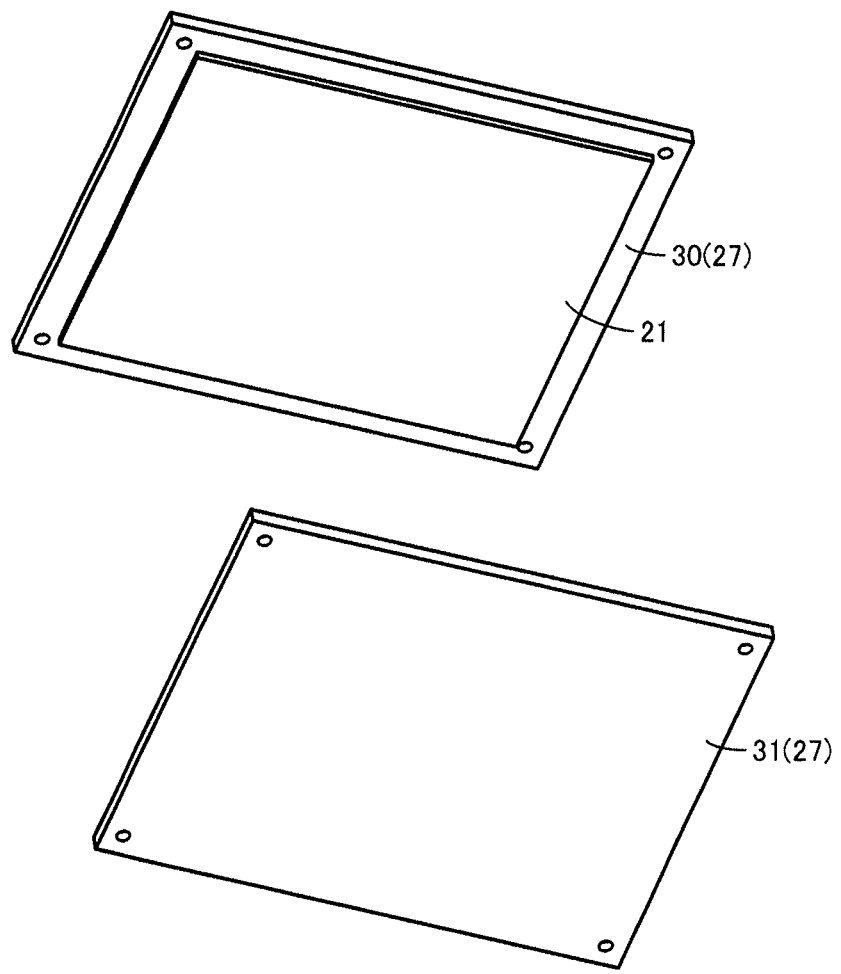
FIG. 11 is an exploded perspective view showing a fixation member 27 and a ferrite core 21.

FIG. 11 is an exploded perspective view showing fixation member 27 and ferrite core 21. As shown in FIG. 11, fixation member 27 includes: an insulation piece 30 disposed at the upper surface side of ferrite core 21; and an insulation piece 31 disposed at the lower surface side of ferrite core 21.

Insulation piece 30 and insulation piece 31 are fixed to each other through a bolt 28 shown in FIG. 10 or the like, and ferrite core 21 is sandwiched between insulation piece 30 and insulation piece 31. Because ferrite core 21 is sandwiched between insulation piece 30 and insulation piece 31, ferrite core 21 is protected.

Figure 12:
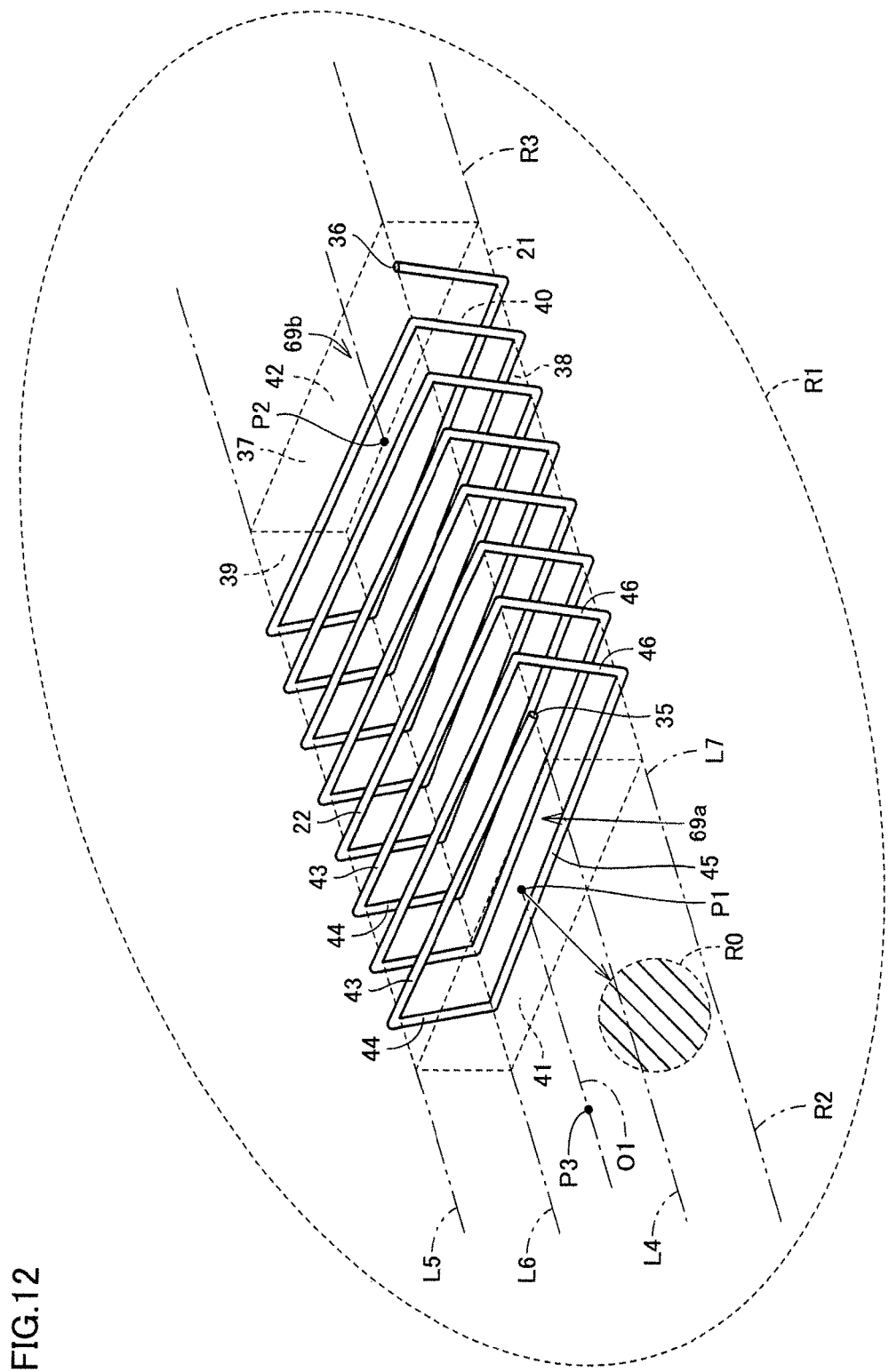
FIG. 12 is a perspective view showing a secondary coil 22.

FIG. 12 is a perspective view showing secondary coil 22. As shown in FIG. 12, secondary coil 22 includes a first end portion 35 and a second end portion 36. As secondary coil 22 extends from first end portion 35 to second end portion 36, secondary coil 22 is formed to surround winding axis O1 and be displaced in the direction in which winding axis O1 extends. Secondary coil 22 is formed by winding a coil wire for a plurality of times. It is to be noted that first end portion 35 and second end portion 36 are disposed at the both ends of secondary coil 22 in the direction in which winding axis O1 extends.

In the example shown in FIG. 12, ferrite core 21 is formed to have a substantially rectangular solid shape, and ferrite core 21 includes: an upper surface 37; a bottom surface 38 opposite to upper surface 37 in the thickness direction; side surfaces 39 and 40 arranged in the short direction; and end surfaces 41 and 42 arranged in the longitudinal direction. It is to be noted that ferrite core 21 may be constructed of a plurality of divided ferrite pieces.

Secondary coil 22 includes: long side portions 43 disposed on upper surface 37; short side portions 44 extending downwardly from the end portions of long side portions 43 and disposed on side surface 39; long side portions 45 connected to short side portions 44 and disposed on bottom surface 38; and short side portions 46 connected to the end portions of long side portions 45 and disposed on side surface 40.

One turn of the coil wire around the circumferential surfaces of ferrite core 21 is provided by one long side portion 43, one short side portion 44, one long side portion 45, and one short side portion 46.

Secondary coil 22, which is wound for a plurality of times, includes the plurality of long side portions 43, the plurality of short side portions 44, the plurality of long side portions 45, and the plurality of short side portions 46.

One opening edge portion 69*a* of secondary coil 22 is formed by first end portion 35, long side portion 43 having first end portion 35, short side portion 44 connected to this long side portion 43, long side portion 45 connected to this short side portion 44, and short side portion 46 connected to this long side portion 45.

The other opening edge portion 69*b* is formed by second end portion 36, short side portion 46 having this second end portion 36, long side portion 45 connected to this short side portion 46, short side portion 44 connected to this long side portion 45, and long side portion 43 connected to this short side portion 44. Thus, at each of the ends of secondary coil 22, each of openings 69*a*, 69*b* is formed by one turn of coil wire.

Figure 13:
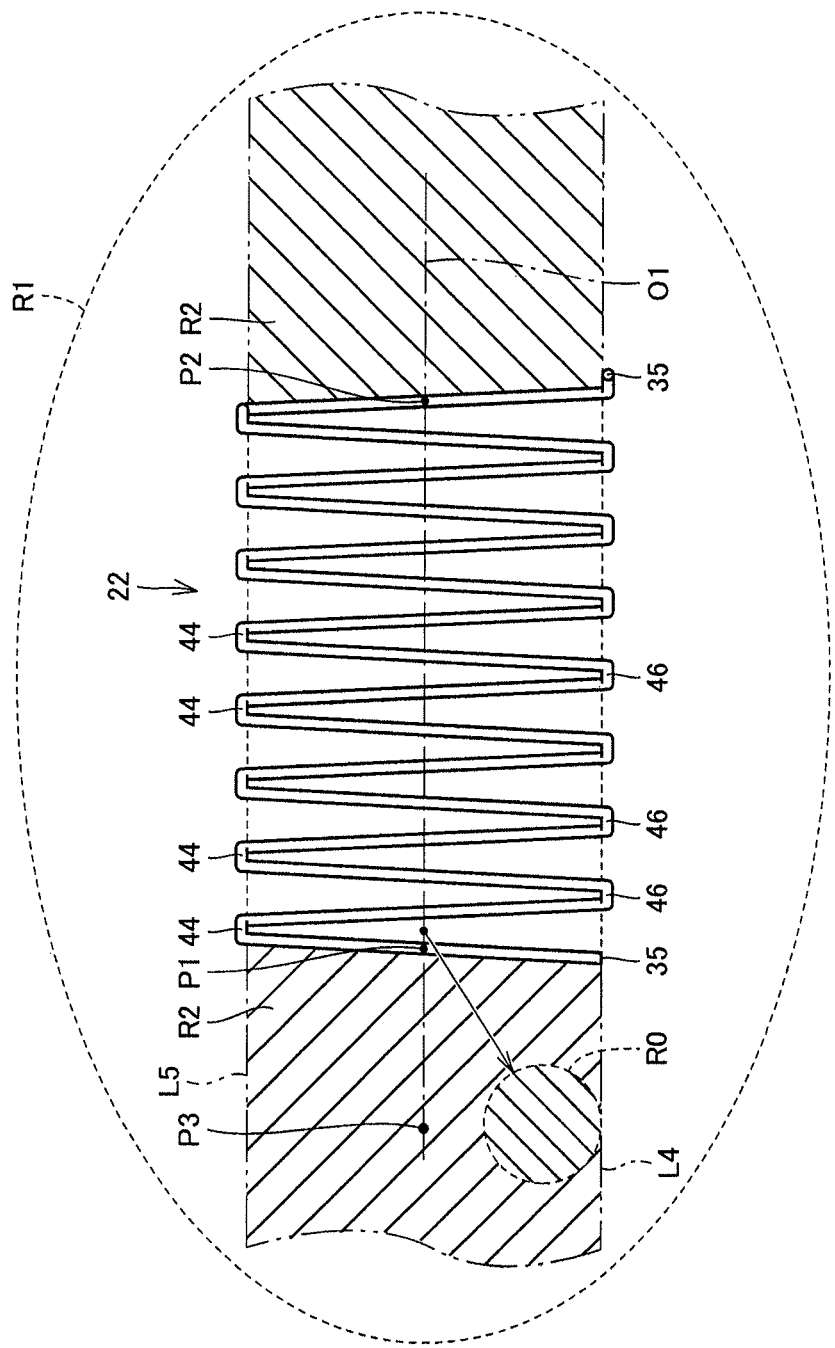
FIG. 13 is a plan view showing secondary coil 22 when viewed in plan.

FIG. 13 is a plan view of secondary coil 22 when viewed in plan. As shown in FIG. 13, the plurality of short side portions 46 are arranged in the direction in which winding axis O1 extends, and the plurality of short side portions 44 are arranged in a similar manner in the direction in which winding axis O1 extends.

Short side portion 44 and short side portion 46 are disposed on the same imaginary horizontal plane, and short side portion 44 and short side portion 46 face each other with winding axis O1 therebetween.

In the present embodiment, secondary coil 22 is formed to have a quadrangular shape when viewed from the front surface, but various types of shapes can be employed for the shape of the coil, such as an elliptical shape, an oval shape, and a polygon shape.

Figure 14:
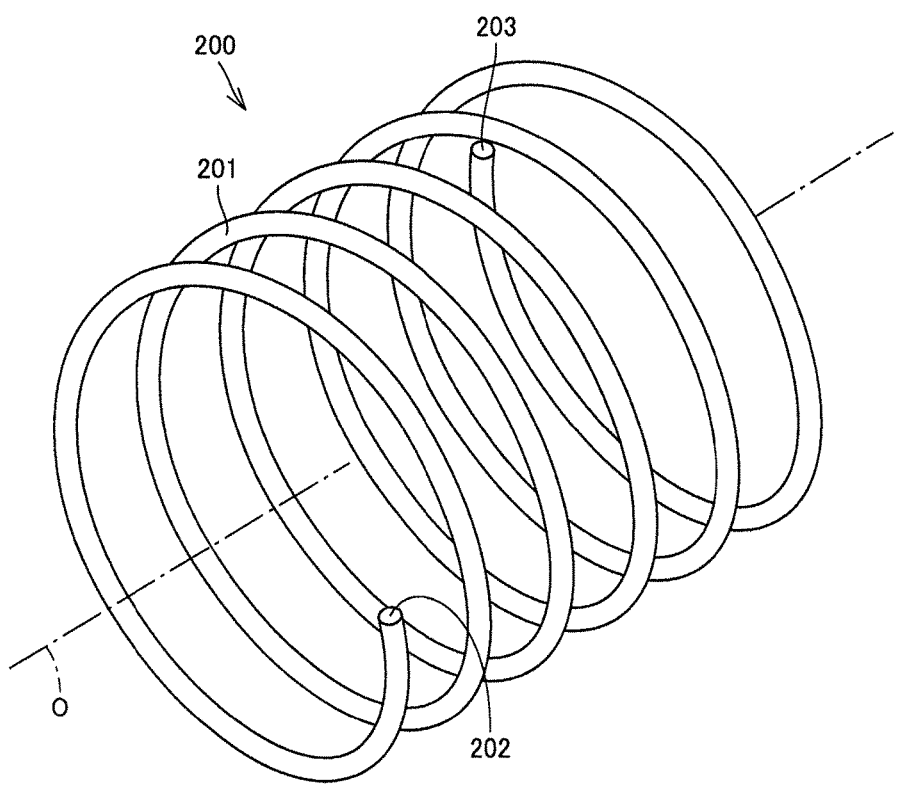
FIG. 14 is a perspective view showing a coil 200 as a model.

Here, the winding axis of the coil will be described with reference to FIG. 14 to FIG. 16. FIG. 14 is a perspective view showing coil 200 as a model. Coil 200 is formed by curving coil wire 201 to surround winding axis O.

Coil 200 is formed by winding coil wire 201 for a plurality of times. From end portion 202 to end portion 203 of coil 200, coil 200 is divided into minute portions dp each having a minute length dL.

Figure 15:
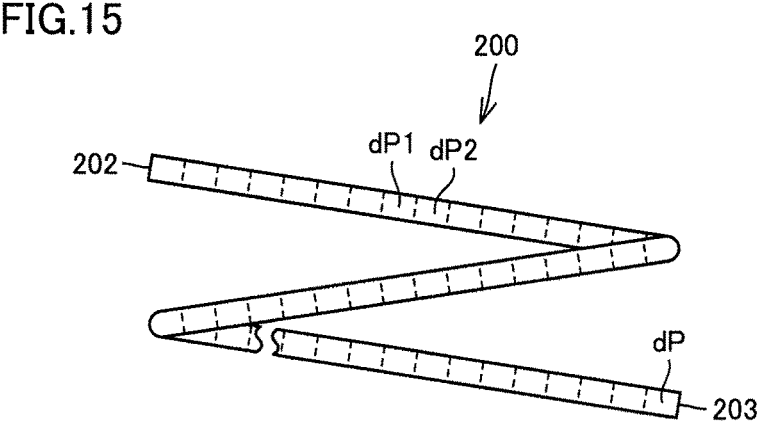
FIG. 15 is a side view showing that coil 200 is divided into a plurality of minute portions dp.
Figure 16:
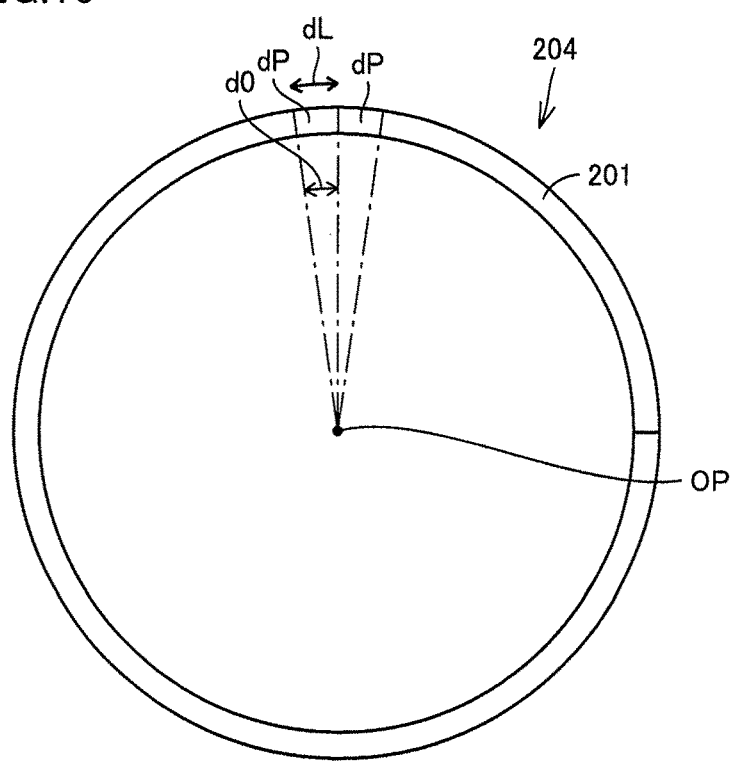
FIG. 16 is a front view showing that coil 200 is divided into the plurality of minute portions dp.

FIG. 15 is a side view showing coil 200 divided into the plurality of minute portions dp, and FIG. 16 is a front view showing coil 200 divided into the plurality of minute portions dp. Here, winding axis O is derived by approximation such that it passes through curvature center point OP of each minute portion dp and a vicinity of curvature center point OP. It is to be noted that various types of approximation methods such as linear approximation, logarithm approximation, and polynomial approximation can be used to derive winding axis O, which is an imaginary line, from each curvature center point OP.

It is to be noted that coil 200 shown in FIG. 14 has an equal pitch, and coil 200 has a winding diameter constant from end portion 202 to end portion 203. Accordingly, curvature center points OP of minute portions dp are arranged in one straight line, so that winding axis O is a straight line. Likewise, also in secondary coil 22 according to the present embodiment shown in FIG. 12 and FIG. 13, the winding axis is a straight line.

Here, the following describes a "region disposed in a direction different from a direction in which a winding axis extends from a coil". First, the "direction in which winding axis O1 extends from secondary coil 22" is a direction in which winding axis O1 extends from center points P1, P2 of the openings surrounded by opening edge portions 69a, 69b of secondary coil 22. It is to be noted that in the present embodiment, winding axis O1 is an imaginary straight line passing through center points P1, P2 of the openings surrounded by opening edge portions 69a, 69b. Thus, the "region disposed in the direction different from the direction in which the winding axis extends from the coil" is a region disposed in a direction different from the direction in which winding axis O1 extends from center points P1, P2. In a region R0 shown in FIG. 12, the direction extending from center point P1 to region R0 is the direction different from the direction in which winding axis O1 extends from center point P1. Accordingly, region R0 is included in the "region disposed in the direction different from the direction in which the winding axis extends from the coil". It is to be noted that region R0 shown in FIG. 12 is one example of the "region disposed in the direction different from the direction in which the winding axis extends from the coil", and the "region disposed in the direction different from the direction in which the winding axis extends from the coil" may be a region satisfying the above-described condition.

Figure 17:
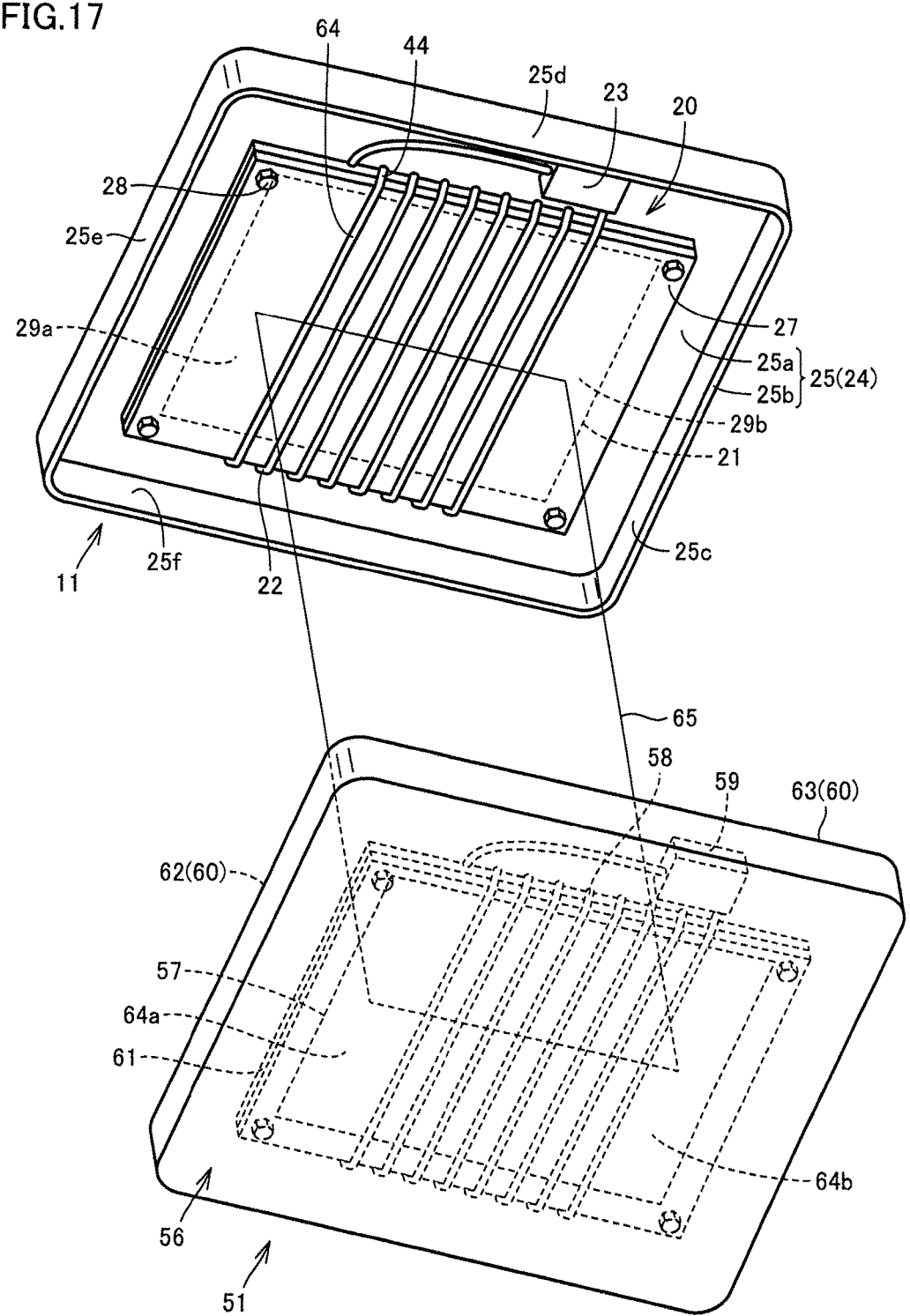
FIG. 17 is a perspective view showing a state in which power reception unit 20 and power transmission unit 56 are disposed to face each other.

FIG. 17 is a perspective view showing a state in which power reception unit 20 and power transmission unit 56 are disposed to face each other. It is to be noted that in FIG. 17, cover portion 26 provided in power reception device 11 is not shown in the figure.

As shown in FIG. 13, during transfer of electric power, power reception unit 20 and power transmission unit 56 are disposed to face each other with an air gap therebetween.

Power transmission unit 56 includes: a case 60 having primary coil 58 and the like contained therein; a fixation member 61 contained in case 60; ferrite core 57 contained in fixation member 61; primary coil 58 attached onto the outer circumferential surface of fixation member 61; and capacitor 59 contained in case 60.

Case 60 includes: a shield 62 made of a metal material such as copper; and a cover member 63 made of a resin and provided on shield 62.

Shield 62 includes a bottom surface portion, and a circumferential wall portion formed to have an annular shape rising upwardly from the outer circumferential edge of the bottom surface portion, and the circumferential wall portion has an upper end portion extending in an annular manner to provide an opening that opens upwardly. Cover member 63 is formed to close the opening formed by the upper end portion of the circumferential wall portion of shield 62.

Ferrite core 57 includes an protrusion portion 64a and an protrusion portion 64b, each of which protrudes in the direction in which the winding axis of primary coil 58 extends. Protrusion portion 64a is formed to protrude from one end side of primary coil 58, whereas protrusion portion 64b protrudes from the other end side of primary coil 58.

Fixation member 61 includes: an insulation piece disposed at the upper surface side of ferrite core 57; and an insulation piece disposed at the lower surface side of ferrite core 57. Ferrite core 57 is sandwiched between these two insulation pieces. The two insulation pieces are fixed to each other by a fastening member such as a bolt and a nut, thereby sandwiching ferrite core 57 between the two insulation pieces. Primary coil 58 is wound around the outer circumferential surface of fixation member 61.

In FIG. 1, in the power transfer system according to the present embodiment, a difference between the natural frequency of power transmission unit 56 and the natural frequency of power reception unit 20 is 10% or less of the natural frequency of power reception unit 20 or power transmission unit 56. By setting the natural frequency of each of power transmission unit 56 and power reception unit 20 to fall within such a range, power transfer efficiency can be improved. Meanwhile, if the difference in natural frequency becomes larger than 10% of the natural frequency of power reception unit 20 or power transmission unit 56, the power transfer efficiency becomes less than 10%, which results in problems such as a long charging time for battery 15.

Here, when no capacitor 59 is provided, the expression "natural frequency of power transmission unit 56" is intended to mean an oscillation frequency at which the electric circuit formed by the inductance of primary coil 58 and the capacitance of primary coil 58 freely oscillates. When capacitor 59 is provided, the expression "natural frequency of power transmission unit 56" is intended to mean an oscillation frequency at which the electric circuit formed by the capacitances of primary coil 58 and capacitor 59 and the inductance of primary coil 58 freely oscillates. In the above-described electric circuit, the natural frequency when the damping force and the electric resistance are set at zero or substantially zero is also called "resonance frequency of power transmission unit 56".

Likewise, when no capacitor 23 is provided, the expression "natural frequency of power reception unit 20" is intended to mean an oscillation frequency at which the electric circuit formed by the inductance of secondary coil 22 and the capacitance of secondary coil 22 freely oscillates. When capacitor 23 is provided, the expression "natural frequency of power reception unit 20" is intended to mean an oscillation frequency at which the electric circuit formed by the capacitances of secondary coil 22 and capacitor 23 and the inductance of secondary coil 22 freely oscillates. In the above-described electric circuit, the natural frequency when the damping force and the electric resistance are set at zero or substantially zero is also called "resonance frequency of power reception unit 20".

Figure 18:
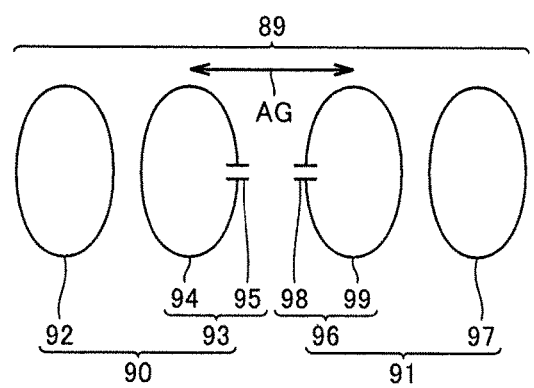
FIG. 18 shows a simulation model of the power transfer system.
Figure 19:
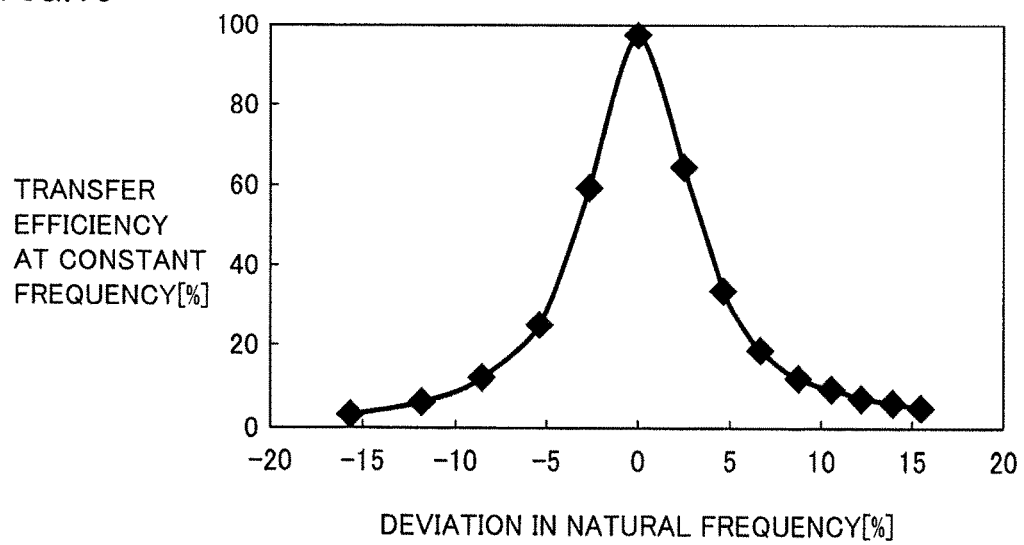
FIG. 19 is a graph showing a relation between power transfer efficiency and deviation in natural frequency between a power transmission unit 93 and a power reception unit 96.

With reference to FIG. 18 and FIG. 19, the following describes a result of simulation in which a relation is analyzed between the difference in natural frequency and the power transfer efficiency. FIG. 18 shows a simulation model of the power transfer system. The power transfer system includes a power transmission device 90 and a power reception device 91. Power transmission device 90 includes a coil 92 (electromagnetic induction coil) and a power transmission unit 93. Power transmission unit 93 includes a coil 94 (resonance coil) and a capacitor 95 provided in coil 94.

Power reception device 91 includes a power reception unit 96 and a coil 97 (electromagnetic induction coil). Power reception unit 96 includes a coil 99 and a capacitor 98 connected to coil 99 (resonance coil).

Assume that the inductance of coil 94 is inductance Lt and the capacitance of capacitor 95 is capacitance C1. Assume that the inductance of coil 99 is inductance Lr and the capacitance of capacitor 98 is capacitance C2. By setting each of the parameters in this way, natural frequency f1 of power transmission unit 93 is indicated by the following formula (1) and natural frequency f2 of power reception unit 96 is indicated by the following formula (2):

$$f1 = 1/\{2\pi(Lt \times C1)^{1/2}\} \quad (1)$$

$$f2 = 1/\{2\pi(Lr \times C2)^{1/2}\} \quad (2)$$

Here, FIG. 19 shows a relation between the power transfer efficiency and the deviation in natural frequency between power transmission unit 93 and power reception unit 96 when only inductance Lt is changed with inductance Lr and capacitances C1, C2 being fixed. In this simulation, a relative positional relation between coil 94 and coil 99 is fixed, and the frequency of current supplied to power transmission unit 93 is constant.

In the graph shown in FIG. 19, the horizontal axis represents the deviation (%) in natural frequency whereas the vertical axis represents the transfer efficiency (%) at the constant frequency. The deviation (%) in natural frequency is indicated by the following formula (3):

$$\text{(Deviation in Natural Frequency)} = \{(f1-f2)/f2\} \times 100 \text{ (\%)} \quad (3)$$

As apparent from FIG. 19, when the deviation (%) in natural frequency is ±0%, the power transfer efficiency is close to 100%. When the deviation (%) in natural frequency is ±5%, the power transfer efficiency is 40%. When the deviation (%) in natural frequency is ±10%, the power transfer efficiency is 10%. When the deviation (%) in natural frequency is ±15%, the power transfer efficiency is 5%. Thus, it is understood that the power transfer efficiency can be improved by setting the natural frequency of each of the power transmission unit and the power reception unit such that the absolute value (difference in natural frequency) of the deviation (%) in natural frequency falls within a range of 10% or less of the natural frequency of power reception unit 96. Further, it is understood that the power transfer efficiency can be more improved by setting the natural frequency of each of the power transmission unit and the power reception unit such that the absolute value of the deviation (%) in natural frequency falls within a range of 5% or less of the natural frequency of power reception unit 96. It is to be noted that electromagnetic field analysis software (JMAG® provided by JSOL Corporation) is employed as simulation software.

The following describes an operation of the power transfer system according to the present embodiment.

In FIG. 1, primary coil 58 is supplied with AC power from high-frequency power driver 54. On this occasion, the electric power is supplied such that the alternating current flowing in primary coil 58 has a specific frequency.

When the current having the specific frequency flows in primary coil 58, an electromagnetic field, which oscillates at the specific frequency, is formed around primary coil 58.

Secondary coil 22 is disposed in a predetermined range from primary coil 58 and receives electric power from the electromagnetic field formed around primary coil 58.

In the present embodiment, helical coils are employed for secondary coil 22 and primary coil 58. Accordingly, magnetic field and electric field, which oscillate at the specific frequency, are formed around primary coil 58 and secondary coil 22 receives electric power mainly from the magnetic field.

Here, the following describes the magnetic field formed around primary coil 58 and having the specific frequency. The "magnetic field having the specific frequency" is typically relevant to the power transfer efficiency and the frequency of current supplied to primary coil 58. First described is a relation between the power transfer efficiency and the frequency of current supplied to primary coil 58. The power transfer efficiency when transferring electric power from primary coil 58 to secondary coil 22 is changed depending on various factors such as a distance between primary coil 58 and secondary coil 22. For example, the natural frequencies (resonance frequencies) of power transmission unit 56 and power reception unit 20 are assumed as natural frequency f0, the frequency of current supplied to primary coil 58 is assumed as frequency f3, and the air gap between secondary coil 22 and primary coil 58 is assumed as air gap AG.

Figure 20:
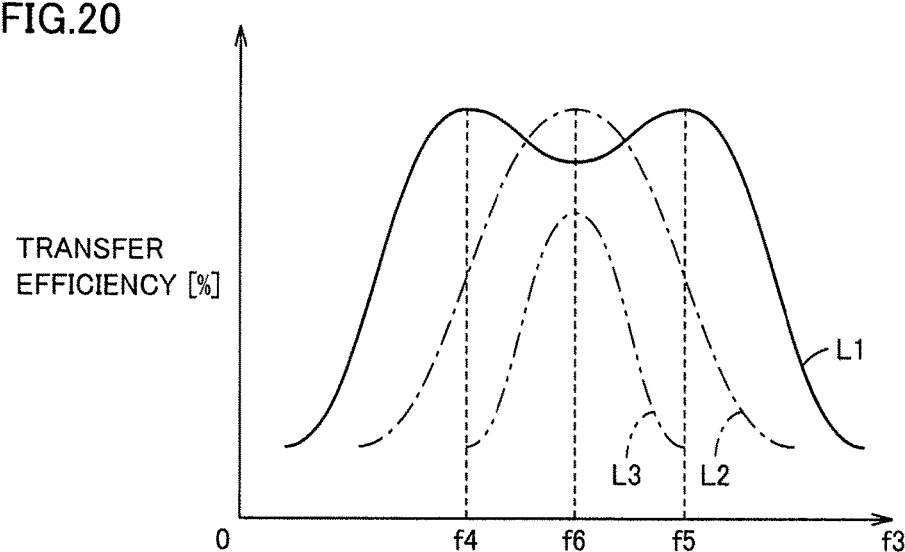
FIG. 20 is a graph indicating a relation between the power transfer efficiency and frequency f3 of current supplied to primary coil 58 when an air gap AG is changed with a natural frequency f0 being fixed.

FIG. 20 is a graph indicating a relation between the power transfer efficiency and frequency f3 of current supplied to primary coil 58 when air gap AG is changed with natural frequency f0 being fixed.

In the graph shown in FIG. 20, the horizontal axis represents frequency f3 of the current supplied to primary coil 58 whereas the vertical axis represents the power transfer efficiency (%). An efficiency curve L1 schematically represents a relation between the power transfer efficiency when air gap AG is small and frequency f3 of the current supplied to primary coil 58. As indicated by efficiency curve L1, when air gap AG is small, peaks of the power transfer efficiency appear at frequencies f4, f5 (f4<f5). When air gap AG is made larger, the two peaks at which the power transfer efficiency becomes high are changed to come closer to each other. Then, as indicated by an efficiency curve L2, when air gap AG is made larger than a predetermined distance, one peak of the power transfer efficiency appears. The peak of the power transfer efficiency appears when the current supplied to primary coil 58 has a frequency f6. When air gap AG is made further larger from the state of efficiency curve L2, the peak of the power transfer efficiency becomes smaller as indicated by an efficiency curve L3.

For example, as a technique of improving the power transfer efficiency, the following first technique can be considered. The first technique is to change a characteristic of the power transfer efficiency between power transmission unit 56 and power reception unit 20 by changing the capacitances of capacitor 59 and capacitor 23 in accordance with air gap AG with the frequency of the current supplied to primary coil 58 shown in FIG. 1 being constant. Specifically, with the frequency of the current supplied to primary coil 58 being constant, the capacitances of capacitor 59 and capacitor 23 are adjusted to attain a peak of the power transfer efficiency. In this technique, irrespective of the size of air gap AG, the frequency of the current flowing in primary coil 58 and secondary coil 22 is constant. It is to be noted that as the technique of changing the characteristic of the power transfer efficiency, the following techniques can be also employed: a technique of using a matching device provided between power transmission device 50 and high-frequency power driver 54; and a technique of using converter 14.

Meanwhile, a second technique is a technique of adjusting, based on the size of air gap AG, the frequency of the current supplied to primary coil 58. For example, in FIG. 20, when the power transfer characteristic corresponds to efficiency curve L1, primary coil 58 is supplied with current having frequency f4 or frequency f5. On the other hand, when the frequency characteristic corresponds to efficiency curve L2 or L3, primary coil 58 is supplied with current having frequency f6. In this case, the frequency of the current flowing in each of primary coil 58 and secondary coil 22 is changed in accordance with the size of air gap AG.

In the first technique, the frequency of the current flowing in primary coil 58 becomes a fixed, constant frequency. In the second technique, the frequency thereof flowing in primary coil 58 becomes a frequency appropriately changed according to air gap AG. With the first technique, the second technique, or the like, primary coil 58 is supplied with current having a specific frequency set to attain high power transfer efficiency. Because the current having the specific frequency flows in primary coil 58, a magnetic field (electromagnetic field), which oscillates at the specific frequency, is formed around primary coil 58. Power reception unit 20 receives electric power from power transmission unit 56 via the magnetic field formed between power reception unit 20 and power transmission unit 56 and oscillating at the specific frequency. Therefore, "the magnetic field oscillating at the specific frequency" is not necessarily a magnetic field having a fixed frequency. It is to be noted that in the above-described example, the frequency of the current supplied to primary coil 58 is set based on air gap AG, but the power transfer efficiency is also changed according to other factors such as a deviation in the horizontal direction between primary coil 58 and secondary coil 22, so that the frequency of the current supplied to primary coil 58 may be adjusted based on the other factors.

It is to be also noted that the example employing the helical coil as the resonance coil has been illustrated, but when an antenna such as a meander line antenna is employed as the resonance coil, an electric field having the specific frequency is formed around primary coil 58 as a result of flow of the current having the specific frequency in primary coil 58. Through this electric field, electric power is transferred between power transmission unit 56 and power reception unit 20.

Figure 21:
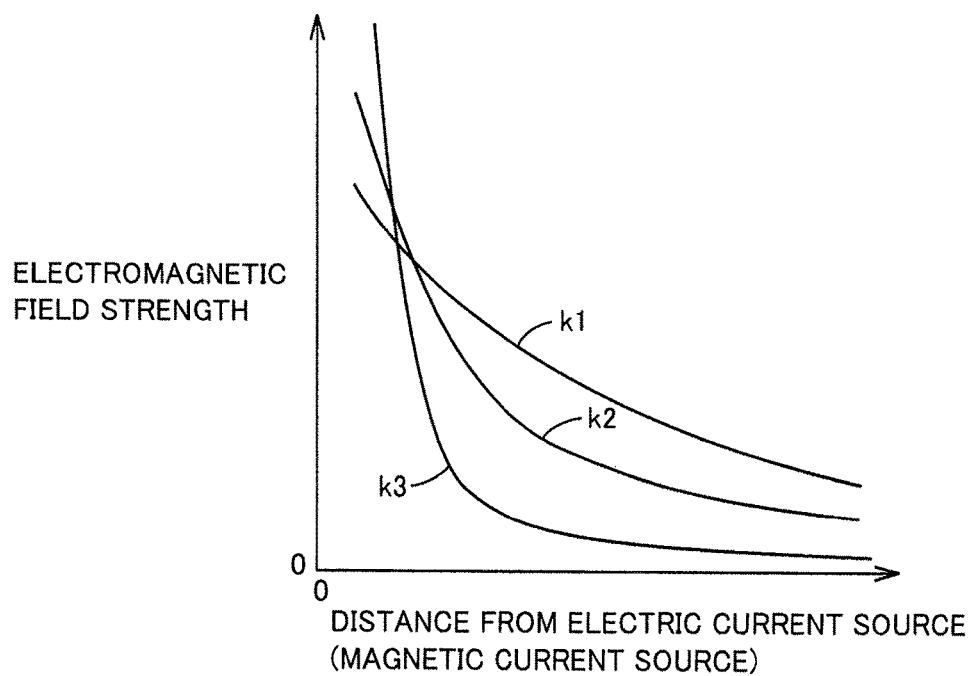
FIG. 21 shows a relation between a distance from an electric current source or magnetic current source and the strength of the electromagnetic field.

In the power transfer system according to the present embodiment, efficiency in power transmission and power reception is improved by employing a near field (evanescent field) in which an "electrostatic magnetic field" of the electromagnetic field is dominant. FIG. 21 shows a relation between a distance from the electric current source or magnetic current source and the strength of the electromagnetic field. Referring to FIG. 21, the electromagnetic field is constituted of three components. A curve k1 represents a component in inverse proportion to the distance from the wave source, and is referred to as "radiation electromagnetic field". A curve k2 represents a component in inverse proportion to the square of the distance from the wave source, and is referred to as "induction electromagnetic field". A curve k3 represents a component in inverse proportion to the cube of the distance from the wave source, and is referred to as "electrostatic magnetic field". Assuming that the wavelength of the electromagnetic field is represented by "$\lambda$", $\lambda/2\pi$ represents a distance in which the strengths of the "radiation electromagnetic field", the "induction electromagnetic field", and the "electrostatic magnetic field" are substantially the same.

The "electrostatic magnetic field" is a region in which the strength of the electromagnetic wave is abruptly decreased as the distance is farther away from the wave source. In the power transfer system according to the present embodiment, the near field (evanescent field), in which this "electrostatic magnetic field" is dominant, is utilized for transfer of energy (electric power). In other words, by resonating power transmission unit 56 and power reception unit 20 (for example, a pair of LC resonant coils) having close natural frequencies in the near field in which the "electrostatic magnetic field" is dominant, the energy (electric power) is transferred from power transmission unit 56 to the other side, i.e., power reception unit 20. This "electrostatic magnetic field" does not propagate energy to a distant place. Hence, the resonance method allows for electric power transmission with less energy loss as compared with the electromagnetic wave in which the "radiation electromagnetic field" propagating energy to a distance place is utilized to transfer energy (electric power).

Thus, in this power transfer system, by resonating the power transmission unit and the power reception unit with each other through the electromagnetic field, electric power can be transmitted contactlessly between the power transmission unit and the power reception unit. The electromagnetic field thus formed between the power reception unit and the power transmission unit may be called, for example, "near field resonance coupling field". Further, a coupling coefficient $\kappa$ between the power transmission unit and the power reception unit is about 0.3 or less, preferably, 0.1 or less, for example. Coupling coefficient $\kappa$ may also fall within a range of about 0.1 to about 0.3. Coupling coefficient $\kappa$ is not limited to such a value, and various values to attain excellent electric power transfer can be employed.

The coupling between power transmission unit 56 and power reception unit 20 during electric power transfer in the present embodiment is called, for example, "magnetic resonance coupling", "magnetic field resonance coupling", "magnetic field resonance coupling", "near field resonance coupling", "electromagnetic field resonance coupling", or "electric field resonance coupling".

The term "electromagnetic field resonance coupling" is intended to indicate coupling including any of the "magnetic resonance coupling", the "magnetic field resonance coupling", and the "electric field resonance coupling".

Each of primary coil 58 of power transmission unit 56 and secondary coil 22 of power reception unit 20 as described in the present specification employs an antenna having a coil shape, so that power transmission unit 56 and power reception unit 20 are coupled to each other mainly by a magnetic field. Thus, power transmission unit 56 and power reception unit 20 are coupled to each other by means of the "magnetic resonance coupling" or the "magnetic field resonance coupling".

It is to be noted that an antenna such as a meander line antenna can be employed as each of primary coil 58 and secondary coil 22, for example. In this case, power transmission unit 56 and power reception unit 20 are coupled to each other mainly through electric field. On this occasion, power transmission unit 56 and power reception unit 20 are coupled to each other by means of the "electric field resonance coupling".

In FIG. 17, when transferring electric power between power reception unit 20 and power transmission unit 56, primary coil 58 is supplied with alternating current having a predetermined frequency.

By supplying the predetermined alternating current to primary coil 58, an electromagnetic field oscillating at a predetermined frequency is formed around primary coil 58. Then, secondary coil 22 receives electric power from the electromagnetic field. Moreover, a magnetic path 65 is formed between power reception unit 20 and power transmission unit 56.

Magnetic path 65 is formed to pass through protrusion portion 29a, the inside of secondary coil 22, protrusion portion 29b, the air gap, protrusion portion 64b, the inside of primary coil 58, protrusion portion 64a, the air gap, and protrusion portion 29a.

Figure 22:
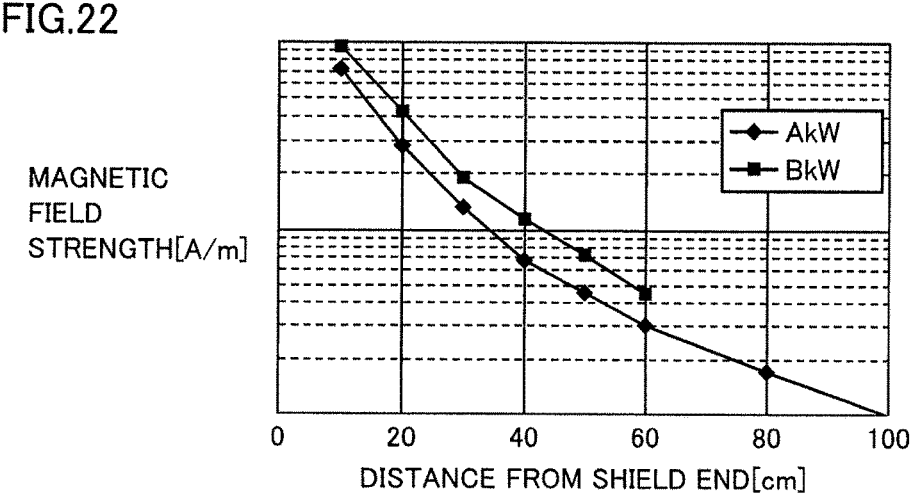
FIG. 22 is a graph showing distribution of the magnetic field in a direction in which a winding axis O1 extends.
Figure 23:
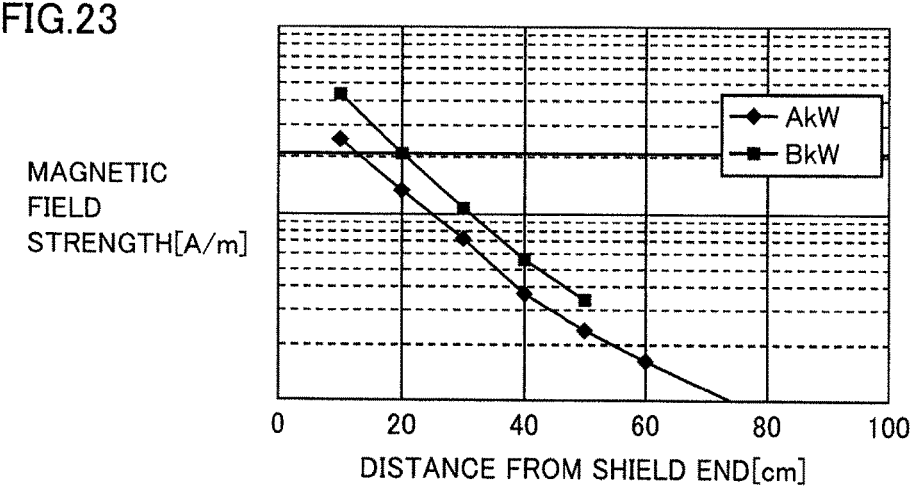
FIG. 23 is a graph showing distribution of the magnetic field in a direction perpendicular to winding axis O1.

Each of FIG. 22 and FIG. 23 is a graph showing distribution of strength of the magnetic field formed around secondary coil 22. FIG. 22 is a graph showing distribution of the magnetic field in the direction in which winding axis O1 extends. The horizontal axis of the graph shown in FIG. 22 represents a distance (cm) from wall portion 25c or wall portion 25e shown in FIG. 10 in the direction in which winding axis O1 extends. The vertical axis of the graph represents the magnetic field strength.

FIG. 23 is a graph showing distribution of the magnetic field in the direction perpendicular to winding axis O1. As shown in FIG. 23, the horizontal axis of the graph represents a distance (cm) from wall portion 25d or wall portion 25f shown in FIG. 10 in the direction perpendicular to winding axis O1. The vertical axis of the graph represents the strength of the magnetic field.

As shown in FIG. 22 and FIG. 23, it is understood that a magnetic field having high strength is distributed to be long in the direction in which winding axis O1 extends.

Figure 24:
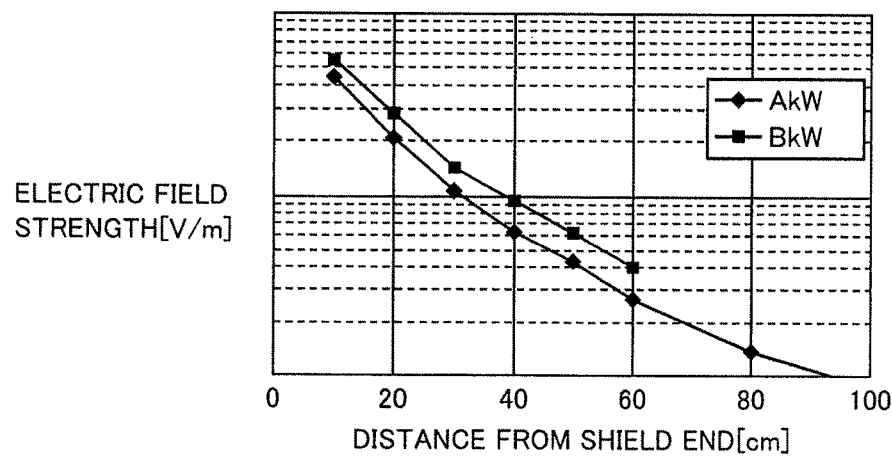
FIG. 24 is a graph showing distribution of the electric field in the direction in which winding axis O1 extends.
Figure 25:
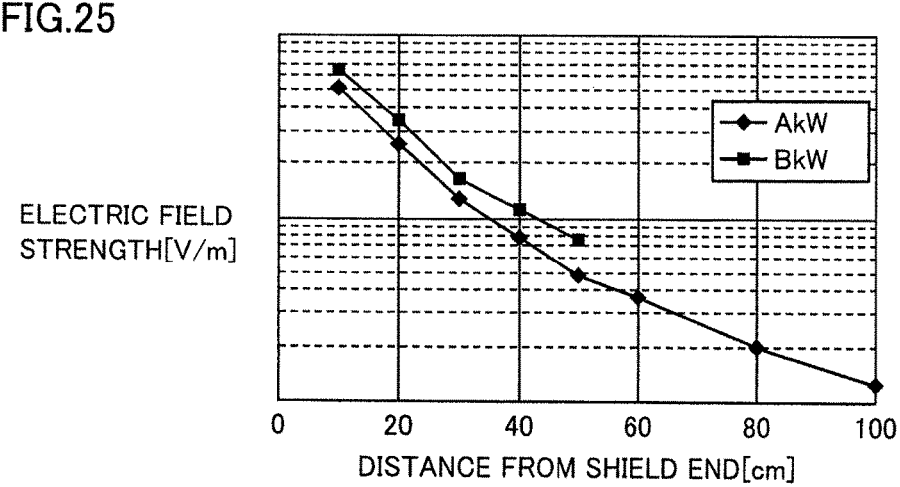
FIG. 25 is a graph showing distribution of the electric field in the direction perpendicular to winding axis O1.

Each of FIG. 24 and FIG. 25 is a graph showing distribution of the electric field formed around secondary coil 22. FIG. 24 is a graph showing distribution of the electric field in the direction in which winding axis O1 extends. The horizontal axis of the graph represents a distance (cm) from wall portion 25c or wall portion 25e shown in FIG. 10 in the direction in which winding axis O1 extends. The vertical axis represents the strength of the electric field.

FIG. 25 is a graph showing distribution of the electric field in the direction perpendicular to winding axis O1. The horizontal axis represents a distance (cm) from wall portion 25d or wall portion 25f shown in FIG. 10 in the direction perpendicular to winding axis O1.

As shown in FIG. 24 and FIG. 25, it is understood that the electric field is distributed to be long in the direction perpendicular to winding axis O1. On the other hand, as apparent from FIG. 24 and FIG. 25, it is understood that the strength of the electric field itself is weak.

In each of FIG. 12 and FIG. 13, region R1 schematically represents a region in which magnetic field (electromagnetic field) takes place during transfer of electric power. As shown in FIG. 12 and FIG. 13, the magnetic field (electromagnetic field) during the transfer of electric power is distributed to have strength higher in the direction in which winding axis O1 extends from center points P1, P2 of secondary coil 22, than in the direction different from the direction in which winding axis O1 extends from center points P1, P2.

It is to be noted that in the present embodiment, the "first direction" corresponds to the "direction different from the direction in which winding axis O1 extends" whereas the "second direction" corresponds to the "direction in which winding axis O1 extends". Thus, the strength of the electromagnetic field in region R0 is lower than the strength of the electromagnetic field in a comparison point P3 of winding axis O1.

Thus, the strength of the electromagnetic field becomes high in the region disposed in the direction in which winding axis O1 extends from center points P1, P2 of secondary coil 22. Accordingly, the strength of the electromagnetic field becomes high in an adjacent region R2 disposed in the direction in which winding axis O1 extends from the opening surrounded by opening edge portion 69a, and an adjacent region R3 disposed in the direction in which winding axis O1 extends from the opening surrounded by opening edge portion 69b.

In this embodiment, adjacent region R2 is a region surrounded by an imaginary line L4, an imaginary line L5, an imaginary line L6, and an imaginary line L7. Imaginary line L4 is an imaginary line extending from first end portion 35 in the direction in which winding axis O1 extends.

Imaginary line L5 is an imaginary line extending from a connection portion of long side portion 43 and short side portion 44 in the direction in which winding axis O1 extends.

Imaginary line L6 is an imaginary line extending from a connection portion of short side portion 44 and long side portion 45 in the direction in which winding axis O1 extends. Imaginary line L7 is an imaginary line extending from a connection portion of long side portion 45 and short side portion 46 in the direction in which winding axis O1 extends. It is to be noted that an adjacent region R3 is also a region surrounded by: an imaginary line extending from second end portion 36 in the direction in which winding axis O1 extends; an imaginary line extending from the connection portion of long side portion 43 and short side portion 44 in the direction in which winding axis O1 extends; and an imaginary line extending from the connection portion of short side portion 44 and long side portion 45 in the direction in which winding axis O1 extends.

In FIG. 8, secondary coil 22 is disposed such that winding axis O1 extends in width direction D2 of electrically powered vehicle 10. It is to be noted that in the present embodiment, secondary coil 22 is disposed such that winding axis O1 is directed in the horizontal direction. The expression "winding axis O1 is directed in the horizontal direction" includes both a case where winding axis O1 extends completely in the horizontal direction and a case where winding axis O1 is directed substantially in the horizontal direction. The expression "winding axis O1 is directed substantially in the horizontal direction" is intended to mean that a crossing angle between the imaginary horizontal plane and winding axis O1 is 10° or less, for example. It is to be noted that the expression "winding axis O1 is directed in the horizontal direction" is not limited to a case where winding axis O1 is directed in width direction D2 as in the example in FIG. 8 and includes a case where winding axis O1 is directed in front-rear direction D1 of electrically powered vehicle 10.

Rectifier 13, converter 14, battery 15, power control unit 16, and motor unit 17 are disposed in a region in the direction different from the direction in which winding axis O1 extends from secondary coil 22. Accordingly, during transfer of electric power, an electromagnetic field having high strength can be suppressed from reaching rectifier 13, converter 14, battery 15, power control unit 16, and motor unit 17.

Secondary coil 22 is disposed such that winding axis O1 extends in width direction D2 of electrically powered vehicle 10, so that adjacent region R2 and adjacent region R3 also extend in width direction D2. Adjacent region R2 extends from secondary coil 22 toward left side surface 71. Adjacent region R3 extends from secondary coil 22 toward right side surface 72.

As described above, adjacent region R2 and adjacent region R3 are regions in which an electromagnetic field having high strength is likely to be formed during transfer of electric power.

As shown in FIG. 8, rectifier 13, converter 14, battery 15, and power control unit 16 and motor unit 17 are disposed in the regions different from adjacent region R2 and adjacent region R3. Thus, rectifier 13, converter 14, battery 15, power control unit 16, and motor unit 17 are provided in the regions not only disposed in the direction different from the direction in which winding axis O1 extends from secondary coil 22 but also away from adjacent region R2 and adjacent region R3.

Thus, by disposing rectifier 13 in the region different from adjacent regions R2, R3, electric elements can be suppressed from being affected.

By disposing converter 14, which includes a plurality of electronic components such as a transistor and a diode, in the region different from adjacent regions R2, R3, converter 14 can be suppressed from being affected by the electromagnetic field. It is to be noted that the electronic components includes: a passive element such as a diode, a transistor, a capacitor, a resistor, a coil, or a relay; and an active element including a plurality of passive elements.

Battery 15 includes: a plurality of battery cells 15a; and an electronic component, such as a thermistor 15b, for measuring a temperature of battery cell 15a. By disposing battery 15 in the region different from adjacent regions R2, R3, the electronic components included in battery 15 can be suppressed from being affected by the electromagnetic field.

Each of the inverter and converter provided in power control unit 16 includes a plurality of diodes and a plurality of transistors, and is constructed of a plurality of electronic components. Because power control unit 16 is disposed in the region different from adjacent regions R2, R3, the above-described electronic components can be suppressed from being affected by the electromagnetic field.

Motor unit 17 includes a rotating electrical machine and a photosensor 17a, for example. Here, the rotating electrical machine includes a rotor rotatably provided and a stator disposed around the rotor. The stator includes a stator coil, and many magnetic fluxes flow between the rotor and the stator. Photosensor 17a is an electronic device that measures the rotation speed of the rotor, and photosensor 17a is constructed of a plurality of electronic components.

Here, because motor unit 17 is disposed in the region different from adjacent regions R2, R3, the magnetic flux formed between the rotor and the stator can be suppressed from being greatly affected by the electromagnetic field formed around power reception unit 20, and photosensor 17a can be also suppressed from being affected by the electromagnetic field.

Interconnections 19a to 19e connecting the electronic devices are disposed in regions different from adjacent regions R2, R3. Accordingly, disturbance can be suppressed from being added to current flowing in each of interconnections 19a to 19e.

Camera 33 is disposed at the rear side of electrically powered vehicle 10 relative to secondary coil 22, adjacent region R2, and adjacent region R3. Accordingly, camera 33 can be suppressed from being affected by the electromagnetic field formed around secondary coil 22.

It is to be noted that all the electronic devices included in electric device module 100 are disposed in positions away from adjacent regions R2, R3 in the present embodiment, but the present invention is not limited to the case where all the electronic devices are disposed in the positions away from adjacent regions R2, R3. At least one electronic device is disposed away from adjacent regions R2, R3.

As shown in FIG. 8, electrically powered vehicle 10 includes an adjacent device at least having a portion disposed in adjacent region R2 or adjacent region R3.

In the present embodiment, as the adjacent device, fuel tank 79, refueling portion 77, charging portion 78, and tool containing portion 101 are included. It is to be noted that tool containing portion 101 is a space for containing a jack, a repairing tool, and the like therein.

Auxiliary tank portion 79b of fuel tank 79 and refueling portion 77 are disposed in adjacent region R2. Moreover, tool containing portion 101 and charging portion 78 are disposed in adjacent region R3.

Here, the number of electronic components included in fuel tank 79 is less than the number of electronic components included in the electronic devices included in electric device module 100. Similarly, the number of electronic components included in each of refueling portion 77, charging portion 78, and tool containing portion 101 is less than the number of electronic components included in each of the above-described electronic devices.

Accordingly, even when the adjacent device is disposed in adjacent regions R2, R3, it is less affected by the electromagnetic field generated from secondary coil 22. Meanwhile, by disposing a device in adjacent regions R2, R3, a dead space can be effectively used.

Second Embodiment

With reference to FIG. 26 to FIG. 29, the following describes an electrically powered vehicle 10 according to a second embodiment. It is to be noted that in the configurations shown in FIG. 26 to FIG. 29, configurations the same as or corresponding to the configurations shown in FIG. 1 to FIG. 25 are given the same reference characters and may not be described repeatedly.

Figure 26:
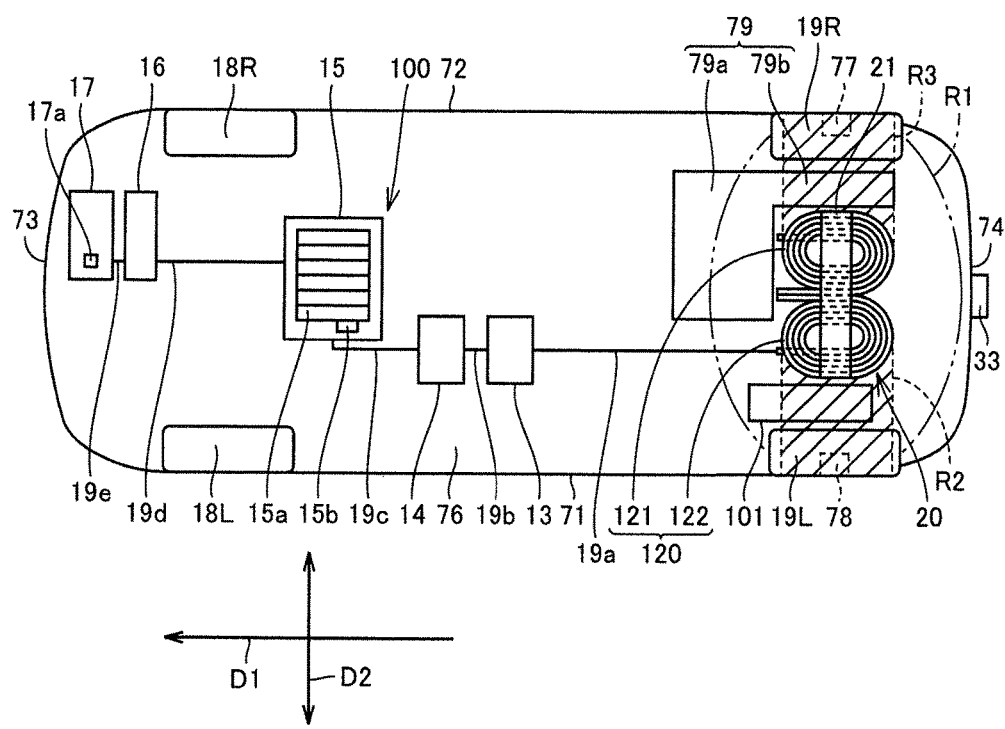
FIG. 26 is a plan view schematically showing an electrically powered vehicle 10 according to a second embodiment.

FIG. 26 is a plan view schematically showing electrically powered vehicle 10 according to the second embodiment. As shown in FIG. 26, power reception unit 20 is disposed between rear wheel 19R and rear wheel 19L.

Figure 27:
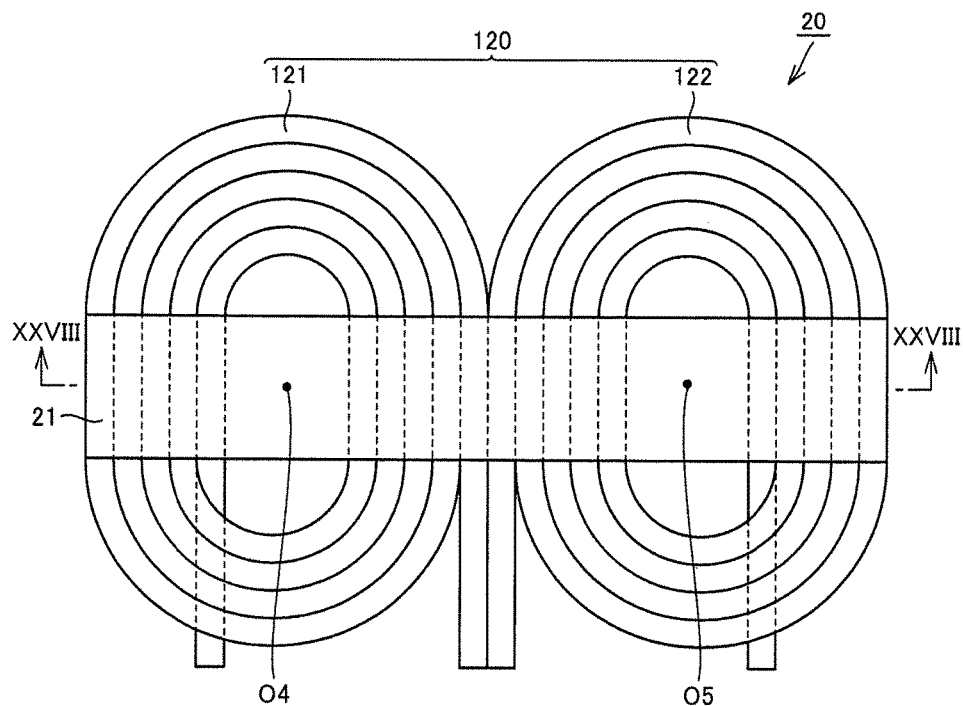
FIG. 27 is a plan view showing a power reception unit 20.
Figure 28:
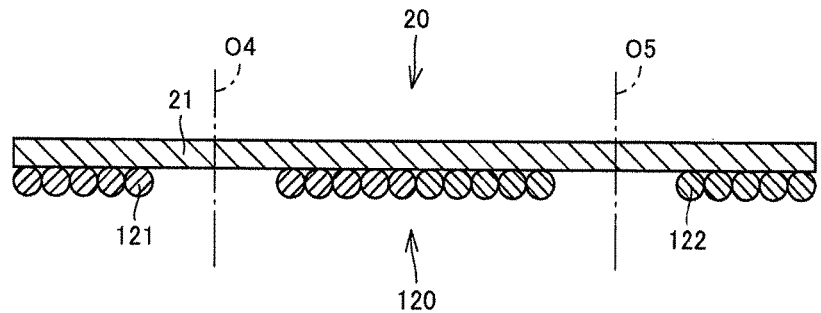
FIG. 28 is a cross sectional view along an XXVIII-XXVIII line shown in FIG. 27.

FIG. 27 is a plan view showing power reception unit 20. FIG. 28 is a cross sectional view taken along a XXVIII-XXVIII line shown in FIG. 27. As shown in FIG. 27 and FIG. 28, power reception unit 20 includes a ferrite core 21, and a coil unit 120 provided on the lower surface of ferrite core 21.

Ferrite core 21 is formed to have a rectangular shape and is disposed to be long in width direction D2 as shown in FIG. 26.

In FIG. 27 and FIG. 28, coil unit 120 includes a coil 121 and a coil 122 arranged side by side in the longitudinal direction of ferrite core 21.

Coil 121 is formed by winding a litz wire (coil wire) around a winding axis O4 extending in the vertical direction, and the litz wire is wound in a plane extending along the lower surface of ferrite core 21.

Coil 122 is formed by winding a litz wire (coil wire) around a winding axis O5 extending in the vertical direction, and the litz wire is wound in an imaginary plane passing through the lower surface of ferrite core 21.

It is to be noted that each of coil 121 and coil 122 is formed by winding the coil wire to form a hollow portion, and ferrite core 21 is exposed through the hollow portions of coil 121 and coil 122.

Figure 29:
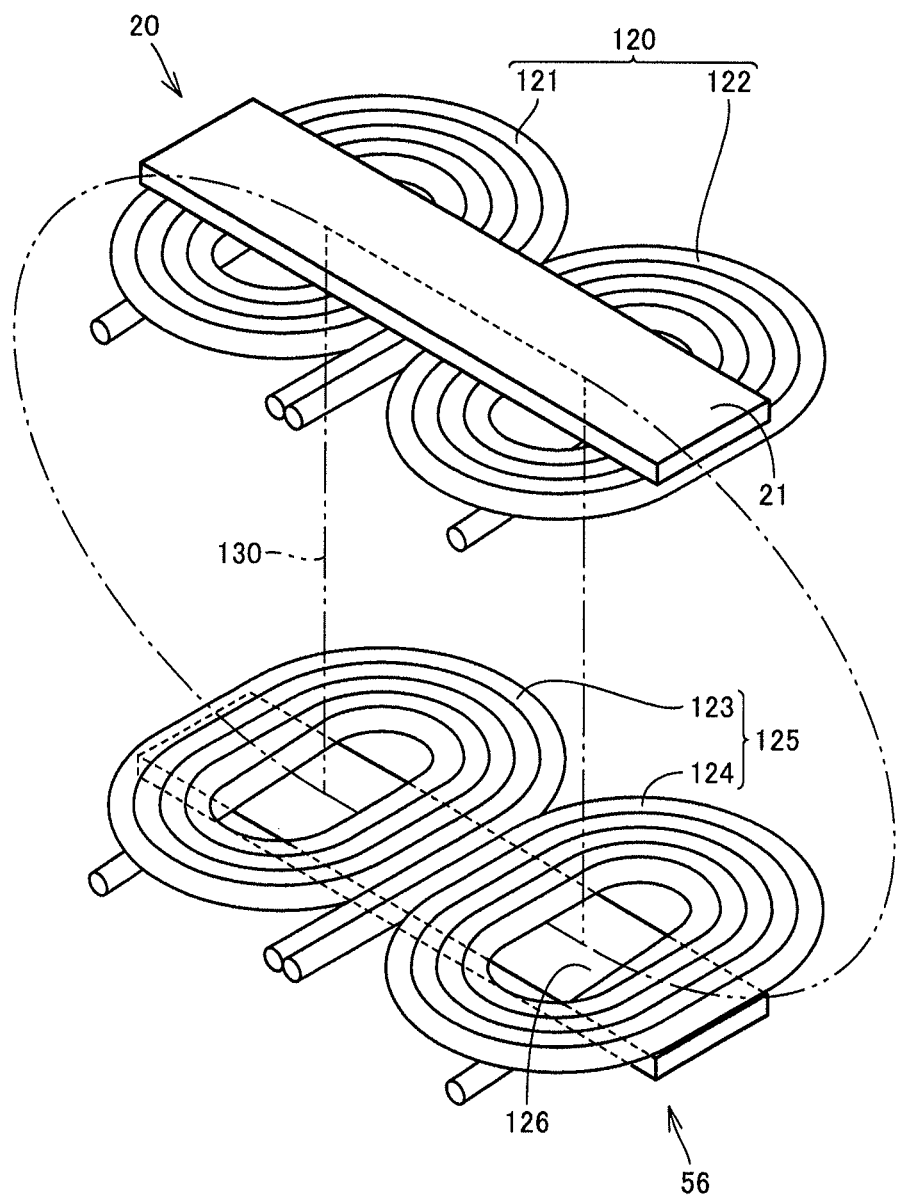
FIG. 29 is a perspective view showing power reception unit 20 and a power transmission unit 56.

FIG. 29 is a perspective view showing power reception unit 20 and power transmission unit 56. As shown in this FIG. 29, power transmission unit 56 is formed in a manner similar to power reception unit 20.

Power transmission unit 56 includes: a core ferrite core 126 formed to have a plate-like shape; and a coil unit 125 disposed on the upper surface of this core ferrite core 126.

Core ferrite core 126 is also formed to have a rectangular shape. Coil unit 125 includes a coil 123 and a coil 124 arranged side by side in the longitudinal direction of core ferrite core 126.

Coil 123 is formed by winding a litz wire (coil wire) to surround the winding axis, and the litz wire is wound in a plane passing through the upper surface of core ferrite core 126. Coil 124 is formed by winding a litz wire to surround the winding axis, and this litz wire is also wound in the plane passing through the upper surface of core ferrite core 126.

Each of coil 123 and coil 124 is formed by winding a coil wire to form a hollow portion, and core ferrite core 126 is exposed through the hollow portions of coil 123 and coil 124.

During transfer of electric power between power reception unit 20 and power transmission unit 56 thus formed, a magnetic path is formed between power reception unit 20 and power transmission unit 56.

Magnetic path 130 passes through the hollow portion of coil 123, the air gap, the hollow portion of coil 121, the portion of ferrite core 21 exposed through the hollow portion of coil 121, and the portion of ferrite core 21 between coil 121 and coil 122. Further, magnetic path 130 passes through the portion of ferrite core 21 exposed through the hollow portion of coil 122, the hollow portion of coil 122, the air gap, and the hollow portion of coil 124. Further, magnetic path 130 passes through the portion of ferrite core 126 exposed through the hollow portion of coil 124, the portion of ferrite core 126 between coil 123 and coil 124, and the portion of ferrite core 126 exposed through the hollow portion of coil 123.

Thus, because magnetic path 130 is formed between power reception unit 20 and power transmission unit 56, electric power transfer efficiency is improved between power reception unit 20 and power transmission unit 56.

Here, in FIG. 29, for example, when a magnetic flux flows from the hollow portion of coil 122 toward the hollow portion of coil 121, a part of the magnetic flux does not flow toward the hollow portion of coil 121, may be emitted from the end portion of ferrite core 21 to outside, and then may reach the end portion of ferrite core 126 through the air gap.

Likewise, when a magnetic flux flows from the hollow portion of coil 121 toward the hollow portion of coil 122, a part of the magnetic flux does not come into the hollow portion of coil 122, is emitted from the end portion of ferrite core 21 to outside, and then reaches the end portion of ferrite core 126.

As a result, as shown in FIG. 26, during transfer of electric power between power reception unit 20 and power transmission unit 56, the electromagnetic field having high strength is distributed more widely in the direction in which coil 121 and coil 122 are arranged side by side than in a direction perpendicular to the direction in which coil 121 and coil 122 are arranged side by side. On the other hand, the electromagnetic field having high strength is less likely to be distributed in the direction crossing (orthogonal to) the direction in which coil 121 and coil 122 are arranged side by side.

Thus, the electromagnetic field having high strength is distributed more widely in the direction in which coil 121 and coil 122 are arranged side by side than in the direction orthogonal to the direction in which coil 121 and coil 122 are arranged side by side. Hence, in the present embodiment, the "first direction" corresponds to the "direction orthogonal to the direction in which coil 121 and coil 122 are arranged side by side", and the "second direction" corresponds to the "direction in which coil 121 and coil 122 are arranged side by side". In the present embodiment, adjacent region R2 is a region extending from coil 121 in the direction in which coil 121 and coil 122 are arranged side by side. Adjacent region R3 is a region extending from coil 122 in the direction in which coil 121 and coil 122 are arranged side by side.

Here, as shown in FIG. 26, rectifier 13, converter 14, battery 15, power control unit 16, and motor unit 17 are disposed at the front side of electrically powered vehicle 10 relative to adjacent region R2, adjacent region R3, and secondary coil 22. Camera 33 is disposed at the rear side of electrically powered vehicle 10 relative to adjacent region R2, adjacent region R3, and secondary coil 22.

Accordingly, the electronic devices such as rectifier 13 can be suppressed from being affected by the electromagnetic field formed around power reception unit 20.

On the other hand, also in the present embodiment, when secondary coil 22 or the like is viewed from above electrically powered vehicle 10, auxiliary tank portion 79b of fuel tank 79 and refueling portion 77 are disposed in adjacent region R3, and tool containing portion 101 and charging portion 78 are disposed in adjacent region R2.

Third Embodiment

With reference to FIG. 30 to FIG. 41, the following describes an electrically powered vehicle 10 according to a third embodiment. It is to be noted that in the configurations shown in FIG. 30 to FIG. 41, configurations the same as or corresponding to the configurations shown in FIG. 1 to FIG. 29 are given the same reference characters and may not be described repeatedly.

Figure 30:
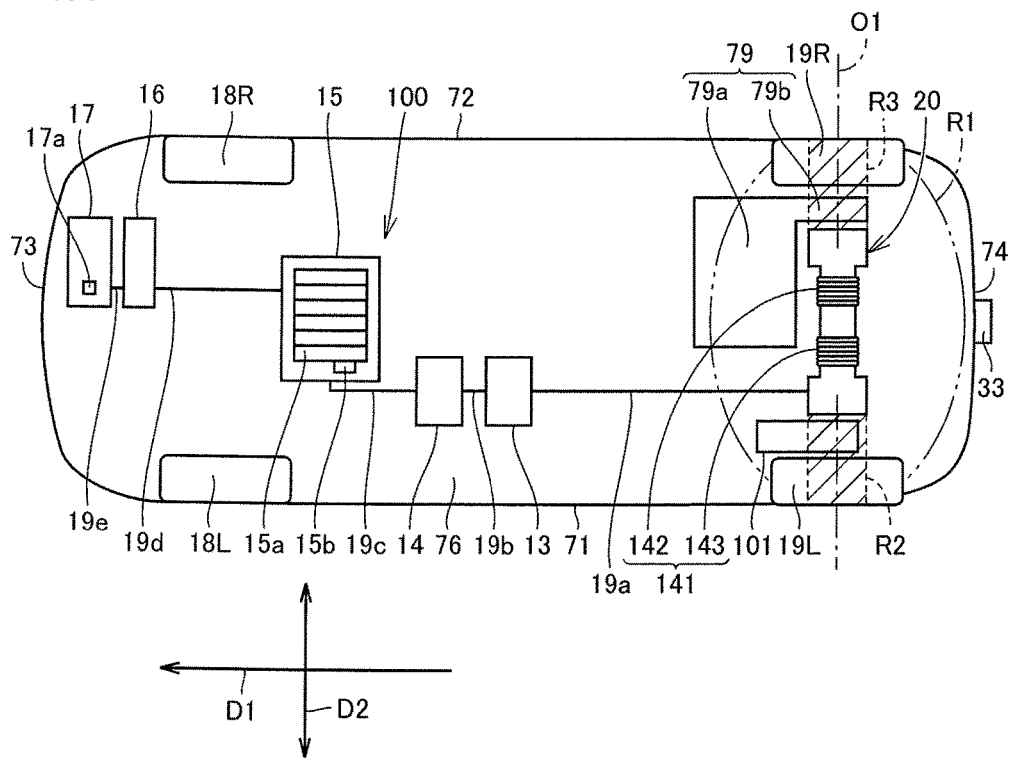
FIG. 30 is a plan view schematically showing an electrically powered vehicle 10 according to a third embodiment.
Figure 31:
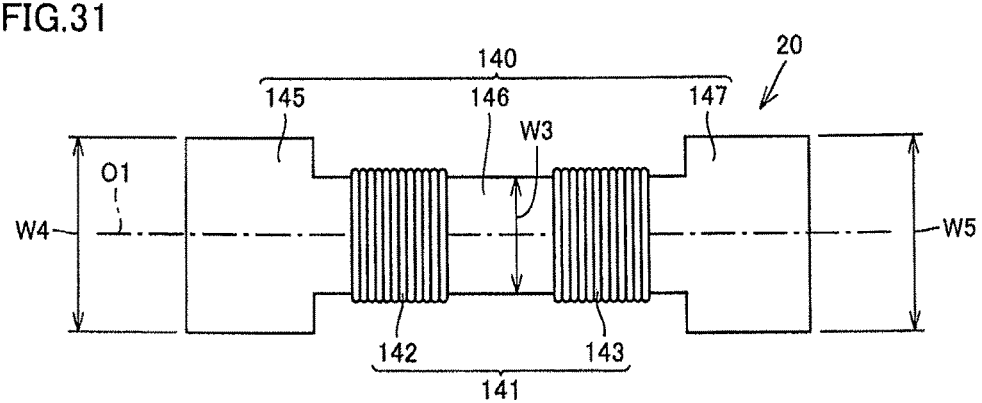
FIG. 31 is a plan view schematically showing a power reception unit 20.

FIG. 30 is a plan view schematically showing electrically powered vehicle 10 according to the third embodiment. FIG. 31 is a plan view schematically showing power reception unit 20. As shown in FIG. 31, power reception unit 20 includes a ferrite core 140 and a coil unit 141 wound around ferrite core 140.

Ferrite core 140 includes: a stem portion 146; a wide portion 145 formed at one end portion of stem portion 146; and a wide portion 147 provided at the other end portion of stem portion 146. Coil unit 141 is formed to have a plate-like shape. Width W4 of wide portion 145 and width W5 of wide portion 147 are larger than width W3 of stem portion 146.

It is to be noted that as power reception unit 20, an aluminum plate may be employed instead of ferrite core 140.

Coil unit 141 includes a coil 142 and a coil 143 wound around stem portion 146. Each of coil 142 and coil 143 is formed to surround winding axis O1. Coil 142 and coil 143 are disposed with a space therebetween in the direction in which winding axis O1 extends, and coil 142 and coil 143 are provided with a space therebetween in the longitudinal direction of stem portion 146.

Here, currents can be separately supplied to coil 142 and coil 143. Accordingly, the direction in which the current flows in coil 142 and the direction in which the current flows in coil 143 can be separately controlled.

It is to be noted that power reception unit 20 according to the present embodiment can receive electric power not only from the same type of power transmission unit 56 but also a different type of power transmission unit 56.

Figure 32:
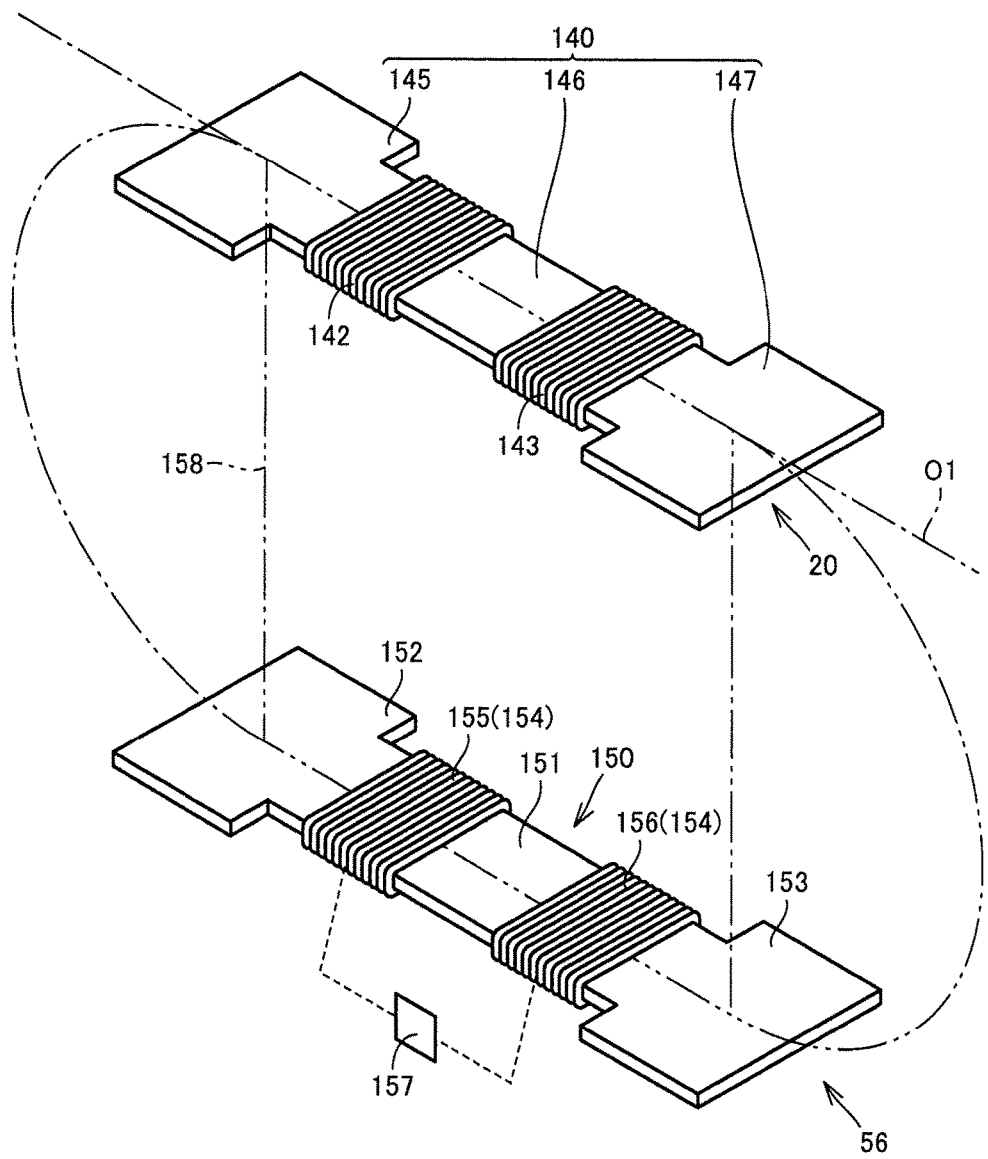
FIG. 32 is a perspective view schematically showing power reception unit 20 and a power transmission unit 56.

Now, with reference to FIG. 32, the following first describes a case where electric power is received from the same type of power transmission unit 56 as power reception unit 20.

FIG. 32 is a perspective view schematically showing power reception unit 20 and power transmission unit 56. As shown in FIG. 32, power transmission unit 56 includes: a ferrite core 150; a coil unit 154 provided on ferrite core 150; and a control unit 157.

Ferrite core 150 includes: a stem portion 151; a wide portion 152 provided at one end portion of stem portion 151; and a wide portion 153 provided at the other end portion of stem portion 151. It is to be noted that the widths of wide portion 152 and wide portion 153 are larger than the width of stem portion 151.

It is to be noted that in power transmission unit 56, an aluminum plate may be employed instead of ferrite core 150.

Coil unit 154 includes: a coil 155 provided on stem portion 151; and a coil 156 provided on stem portion 151 with a space interposed between coil 156 and coil 155.

Here, the direction in which the current flows in coil 155 and the direction in which the current flows in coil 156 can be separately controlled.

Control unit 157 can switch (control) the distribution direction of the current flowing in coil 155 and also can switch (control) the distribution direction of the current flowing in coil 156.

The following describes transfer of electric power between power reception unit 20 and power transmission unit 56 thus formed. Here, in FIG. 32, currents flow in coil 155 and coil 156 in the same direction. Accordingly, a magnetic path 158 is formed. Magnetic path 158 passes through wide portion 152, the inside of coil 155, stem portion 151, the inside of coil 156, wide portion 153, the air gap, wide portion 147, the inside of coil 143, stem portion 146, the inside of coil 142, wide portion 145, and the air gap. Accordingly, currents flow in coil 142 and coil 143. In this way, power reception unit 20 can receive electric power from the same type of power transmission unit 56 as power reception unit 20.

Here, the magnetic flux flowing between wide portion 145 and wide portion 152 becomes wide to some extent. Similarly, the magnetic flux flowing between wide portion 147 and wide portion 153 also becomes wide to some extent. Accordingly, during the transfer of electric power, the electromagnetic field is widely distributed in the direction in which winding axis O1 extends.

Figure 33:
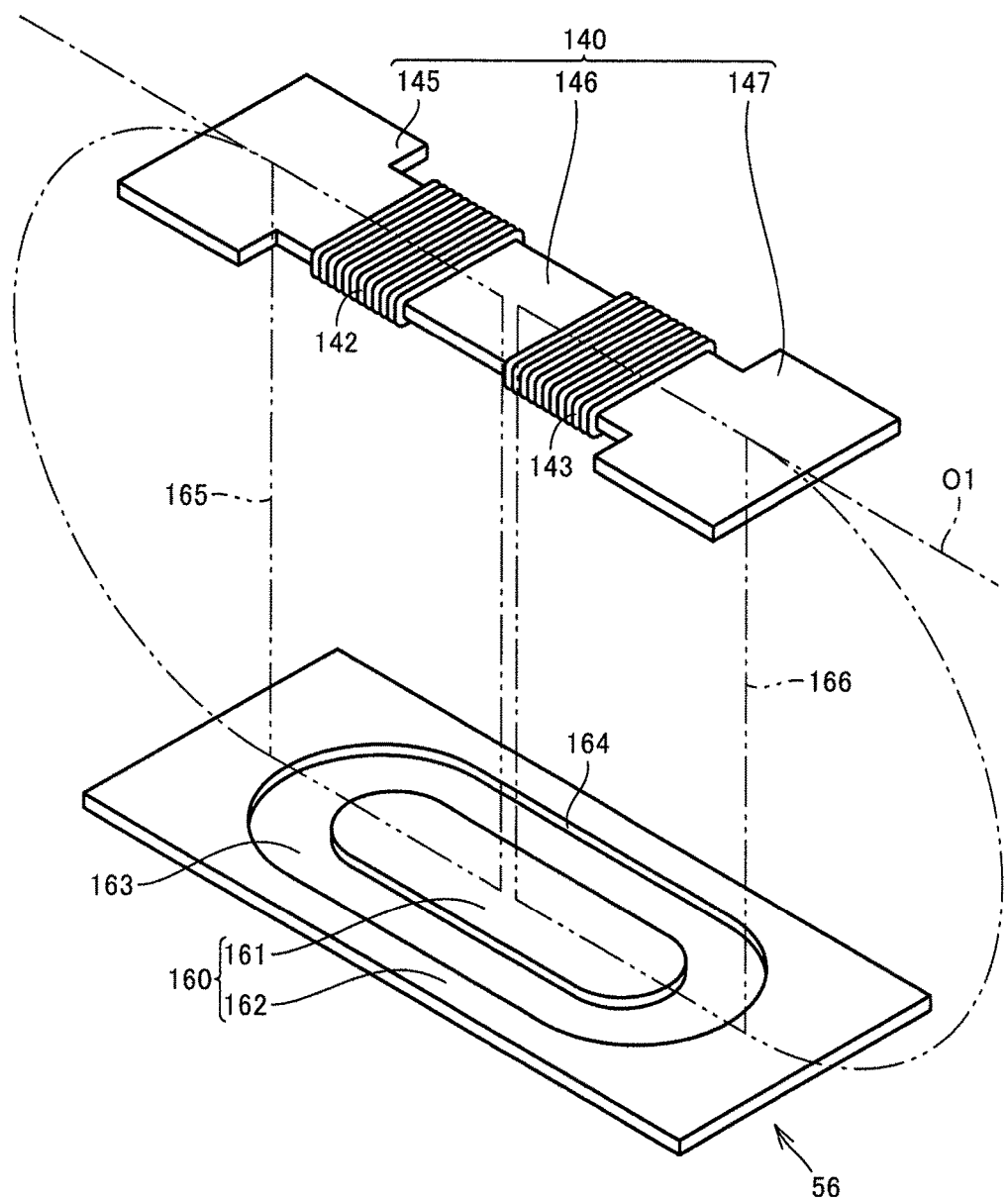
FIG. 33 is a perspective view schematically showing power reception unit 20 and power transmission unit 56.

With reference to FIG. 33, the following describes a mechanism in which power reception unit 20 receives electric power from power transmission unit 56 of a type different from power reception unit 20.

In FIG. 33, power transmission unit 56 includes a ferrite core 160 and a coil 163 provided in ferrite core 160.

Ferrite core 160 includes: a base portion 162 having a plate-like shape and having a groove portion 164 formed at its central portion; and a stem portion 161 formed in groove portion 164. Coil 163 is disposed in groove portion 164 to surround stem portion 161.

The following describes a mechanism of transfer of electric power between power reception unit 20 and power transmission unit 56 thus formed.

Here, when current flows in coil 163, magnetic path 165 and magnetic path 166 are formed. Magnetic path 165 passes through, for example, stem portion 161, the air gap, stem portion 146, the inside of coil 142, wide portion 145, the air gap, and base portion 162.

Magnetic path 166 passes through stem portion 161, the air gap, stem portion 146, the inside of coil 143, wide portion 147, the air gap, and base portion 162.

Then, currents flow into coil 142 and coil 143. On this occasion, the direction in which the current flow in coil 143 is opposite to the direction in which the current flows in coil 142. In this way, power reception unit 20 receives electric power from power transmission unit 56.

Here, when power reception unit 20 described above receives electric power, an electromagnetic field having high strength is widely distributed in the direction in which winding axis O1 of each of coil 142 and coil 143 extends.

Thus, the electromagnetic field having high strength is widely distributed in the direction in which winding axis O1 extends, in both the case where electric power is transferred between power reception unit 20 and power transmission unit 56 of the same type as power reception unit 20 and the case where electric power is transferred between power reception unit 20 and power transmission unit 56 of a type different from power reception unit 20.

In FIG. 30, coil unit 141 is disposed such that winding axis O1 extends in width direction D2. As a result, the electromagnetic field having high strength is widely distributed in the direction in which winding axis O1 extends from secondary coil 22. On the other hand, the electromagnetic field having high strength is not widely distributed in the direction orthogonal to winding axis O1. In the present embodiment, the "first direction" corresponds to the "direction orthogonal to winding axis O1", and the "second direction" corresponds to the "direction in which winding axis O1 extends". Adjacent region R2 is a region extending in the direction in which winding axis O1 extends from coil 143. Adjacent region R3 is a region extending in the direction in which winding axis O1 extends from coil 142. During the transfer of electric power, the electromagnetic field having high strength is distributed in adjacent region R2 and adjacent region R3.

Also in the present embodiment, rectifier 13, converter 14, battery 15, power control unit 16 and motor unit 17 are disposed at the front side of electrically powered vehicle 10 relative to adjacent region R2 and adjacent region R3.

Accordingly, the electronic devices such as rectifier 13 can be suppressed from being greatly affected by the electromagnetic field formed around power reception unit 20.

Camera 33 is disposed at the rear side of electrically powered vehicle 10 relative to adjacent region R2 and adjacent region R3, and therefore the electromagnetic field having high strength is suppressed from reaching camera 33.

Figure 34:
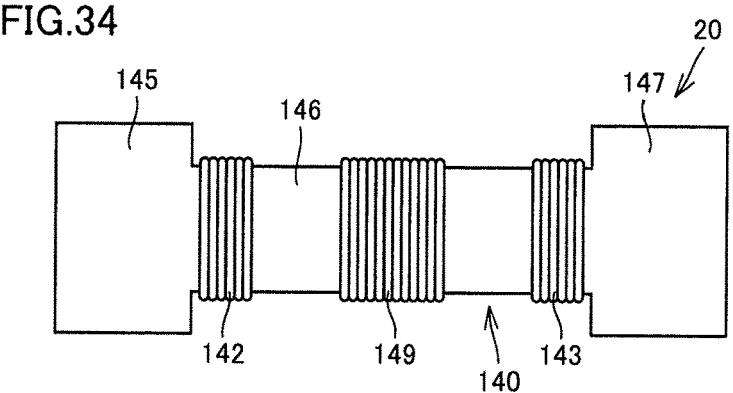
FIG. 34 is a plan view showing a modification of power reception unit 20.
Figure 35:
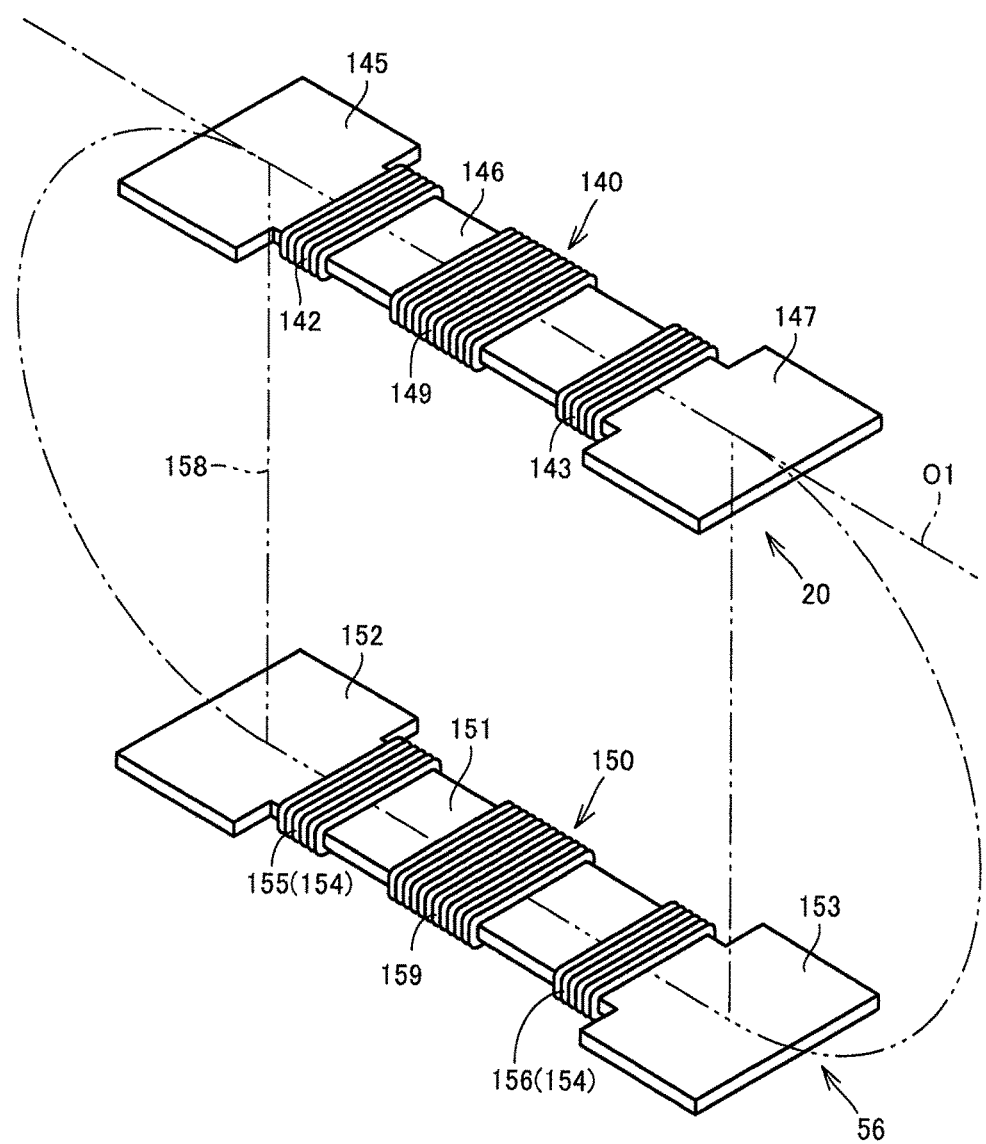
FIG. 35 is a perspective view showing that electric power is being transferred between power reception unit 20 shown in FIG. 34 and power transmission unit 56 of the same type as power reception unit 20.

It is to be noted that FIG. 34 is a plan view showing a modification of power reception unit 20. As shown in FIG. 34, power reception unit 20 further includes an intermediate coil 149 provided between coil 142 and coil 143. Power transmission unit 56 includes a coil 159 provided between coil 155 and coil 156. Also in the example shown in FIG. 34, electric power can be received from various types of power transmission units 56. It is to be noted that FIG. 35 is a perspective view showing that electric power is being transferred between power reception unit 20 shown in FIG. 34 and power transmission unit 56 of the same type as power reception unit 20. As shown in this FIG. 35, magnetic path 158 is formed between power transmission unit 56 and power reception unit 20, and the electromagnetic field is widely distributed in the direction in which winding axis O1 extends.

Figure 36:
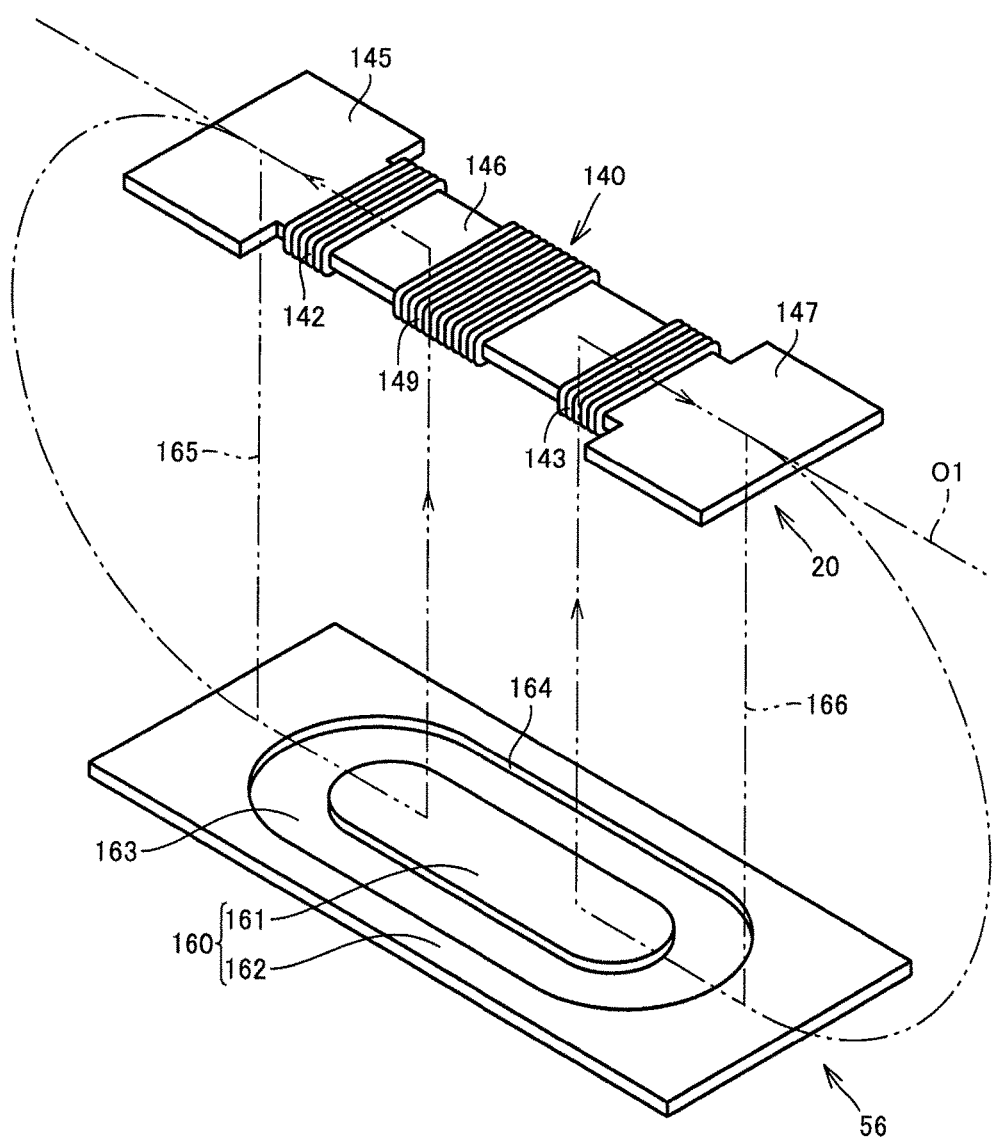
FIG. 36 is a perspective view showing that electric power is being transferred between power reception unit 20 shown in FIG. 34 and power transmission unit 56 of a type different from power reception unit 20.

FIG. 36 is a perspective view showing that electric power is being transferred between power reception unit 20 shown in FIG. 34 and power transmission unit 56 of a type different from power reception unit 20. Also in the example shown in FIG. 36, the electromagnetic field during the transfer of electric power is widely distributed in the direction in which winding axis O1 extends.

Thus, power reception unit 20 shown in FIG. 34 also can receive electric power from various types of power transmission units 56. Thus, the electromagnetic field having high strength is widely distributed in the direction in which winding axis O1 extends, in both the case where electric power is transferred between power reception unit 20 and power transmission unit 56 of the same type as power reception unit 20 and the case where electric power is transferred between power reception unit 20 and power transmission unit 56 of a type different from power reception unit 20. It is to be noted that in the present embodiment, the "first direction" corresponds to the "direction orthogonal to winding axis O1", and the "second direction" corresponds to the "direction in which winding axis O1 extends".

Hence, also in the case where power reception unit 20 shown in FIG. 34 is provided, the electronic devices such as battery 15 are disposed at positions away from adjacent region R2 and adjacent region R3. Accordingly, the electromagnetic field having high strength can be suppressed from reaching electronic devices such as battery 15.

Fourth Embodiment

With reference to FIG. 37 to FIG. 41, the following describes an electrically powered vehicle 10 according to a fourth embodiment. It is to be noted that in the configurations shown in FIG. 37 to FIG. 41, configurations the same as or corresponding to the configurations shown in FIG. 1 to FIG. 36 are given the same reference characters and may not be described repeatedly.

Figure 37:
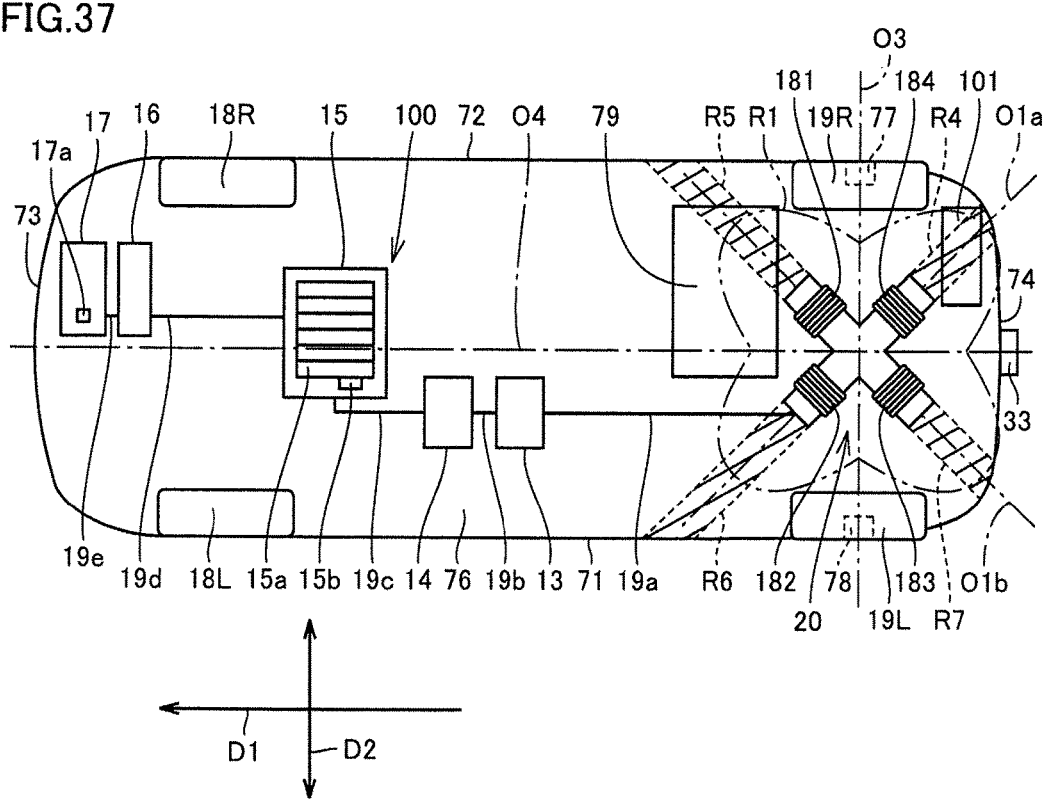
FIG. 37 is a plan view schematically showing an electrically powered vehicle 10 according to a fourth embodiment.

FIG. 37 is a plan view schematically showing electrically powered vehicle 10 according to the fourth embodiment. As shown in FIG. 37, power reception unit 20 is disposed between rear wheel 19L and rear wheel 19R.

Figure 38:
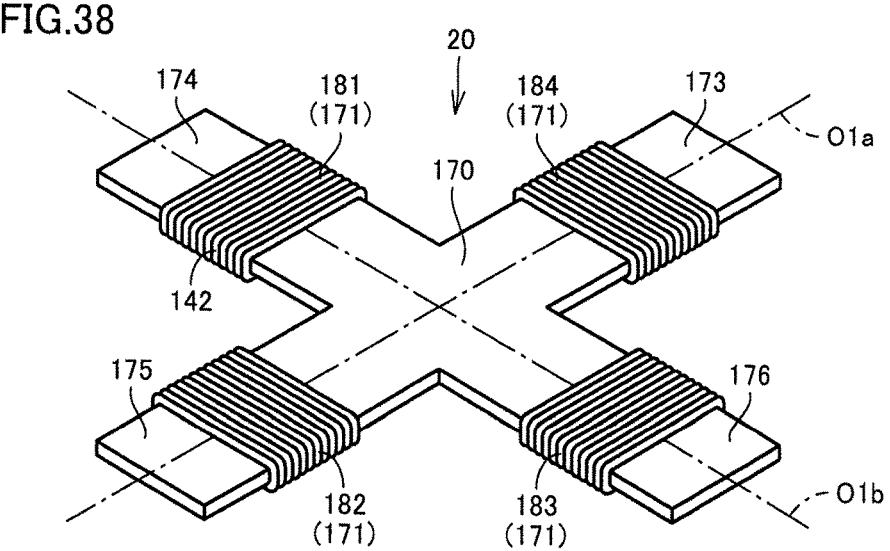
FIG. 38 is a perspective view schematically showing a power transmission unit.

In FIG. 38, power reception unit 20 includes a ferrite core 170 and a coil unit 171 provided in ferrite core 170.

Ferrite core 170 includes a plurality of core pieces 173, 174, 175, 176. Core pieces 173, 174, 175, 176 have ends connected to one another.

Coil unit 171 includes: a coil 184 wound around core piece 173; a coil 181 wound around core piece 174; a coil 182 wound around core piece 175; and a coil 183 wound around core piece 176. Accordingly, ferrite core 170 has a shape of cross. It is to be noted that ferrite core 170 is formed to have a plate-like shape.

Coil 184 and coil 182 are formed to surround a winding axis O1$a$, and coil 184 and coil 182 are disposed with a space therebetween in a direction in which winding axis O1$a$ extends. Coil 181 and coil 183 are formed to surround a winding axis O1$b$, and coil 181 and coil 183 are disposed with a space therebetween in a direction in which winding axis O1$b$ extends. It is to be noted that winding axis O1$a$ and winding axis O1$b$ are orthogonal to each other in the example shown in FIG. 38, but the intersecting angle between winding axis O1$a$ and winding axis O1$b$ may be an acute angle or an obtuse angle.

Figure 39:
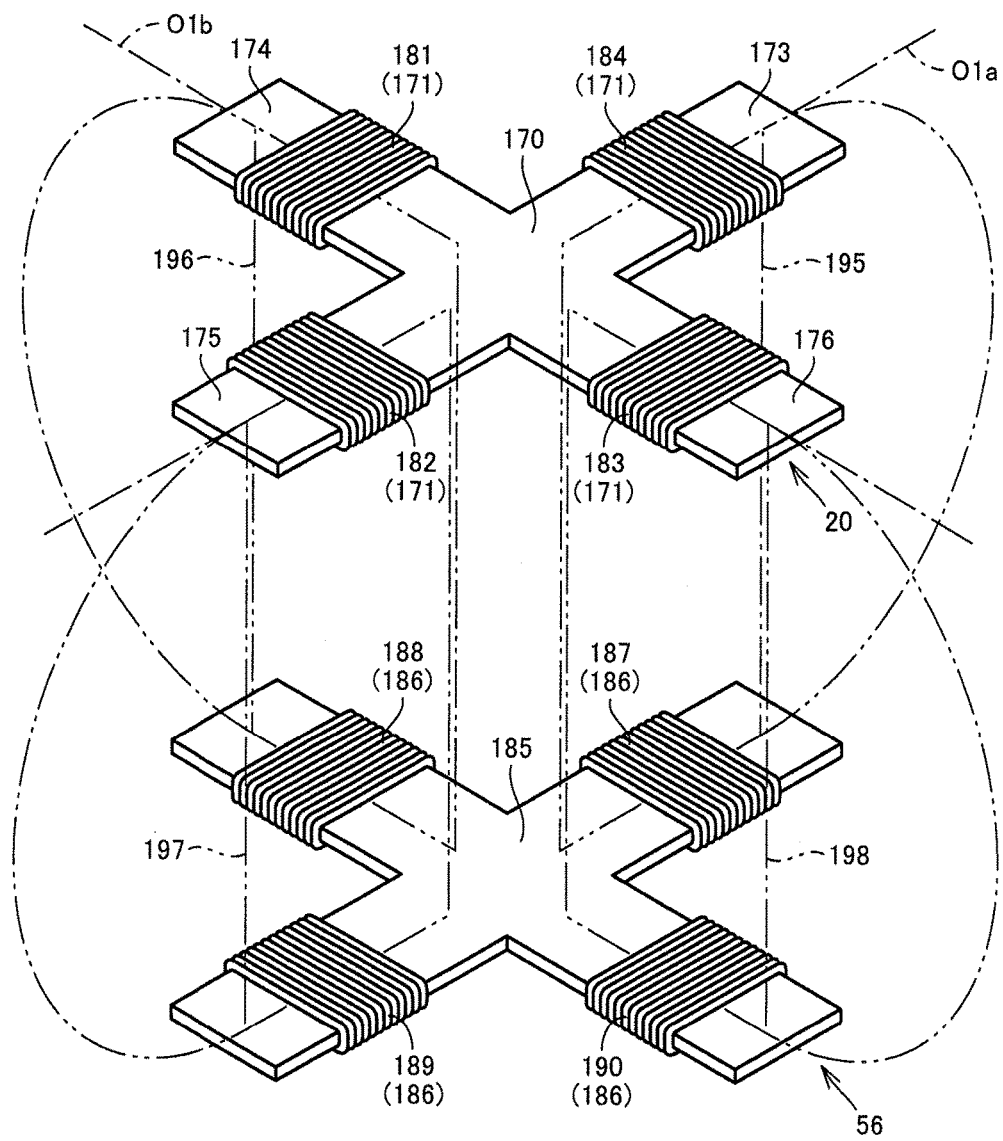
FIG. 39 is a perspective view showing that electric power is being transferred between power reception unit 20 shown in FIG. 38 and power transmission unit 56 of the same type as power reception unit 20.

Power reception unit 20 thus formed can also cope with various types of power transmission units. FIG. 39 is a perspective view showing that electric power is being transferred between power reception unit 20 shown in FIG. 38 and power reception unit 20 of the same type as power reception unit 20. As shown in FIG. 39, power transmission unit 56 includes: a ferrite core 185 having a shape of cross; and a coil unit 186 provided on ferrite core 185.

Ferrite core 185 includes a plurality of core piece portions. Coil unit 186 includes coils 187, 188, 189, 190 respectively wound around the core pieces.

When transferring electric power between power transmission unit 56 and power reception unit 20 thus formed, currents flows in coils 187, 188, 189, 190 of power transmission unit 56. Accordingly, for example, in the example shown in FIG. 39, a magnetic path 195 is formed between coil 184 and coil 187. Magnetic path 196 is formed between coil 181 and coil 188. Magnetic path 197 is formed between coil 182 and coil 189. Magnetic path 198 is formed between coil 183 and coil 190.

Thus, the plurality of magnetic paths are formed between power reception unit 20 and power transmission unit 56, whereby power reception unit 20 receives electric power from power transmission unit 56. Thus, during the transfer of electric power between power reception unit 20 and power transmission unit 56, the magnetic flux expands between core piece 173 and ferrite core 185 in the direction in which winding axis O1$a$ extends. Between core piece 175 and ferrite core 185, the magnetic flux expands in the direction in which winding axis O1$a$ extends. Moreover, between core piece 174 and ferrite core 185 and between core piece 176 and ferrite core 185, the magnetic flux expands in the direction in which winding axis O1$b$ extends.

Assume that bisectors of winding axis O1$a$ and winding axis O1$b$ are represented by an imaginary straight line O3 and an imaginary straight line O4. It is to be noted that imaginary straight line O3 and imaginary straight line O4 pass through the intersection between winding axis O1$a$ and winding axis O1$b$.

The electromagnetic field having high strength is widely distributed in the direction in which winding axis O1$b$ extends from each of coils 181, 183, and is widely distributed in the direction in which winding axis O1$a$ extends from each of coils 182, 184.

On the other hand, the electromagnetic field having high strength is less likely to be distributed in the direction in which each of imaginary straight line O3 and imaginary straight line O4 extends.

In the present embodiment, in FIG. 37, the "first direction" corresponds to the "direction in which each of imaginary straight line O3 and imaginary straight line O4 extends" and the "second direction" corresponds to the "direction in which each of winding axes O1$a$, O1$b$ extends".

Here, in FIG. 37, when viewing electrically powered vehicle 10 from above, adjacent region R4 is a region extending in the direction in which winding axis O1$a$ extends from coil 184. Adjacent region R5 is a region extending in the direction in which winding axis O1$b$ extends from coil 181. Adjacent region R6 is a region extending in the direction in which winding axis O1$a$ extends from coil 182. Adjacent region R7 is a region extending in the direction in which winding axis O1$b$ extends from coil 183. During the transfer of electric power, the electromagnetic field having high strength is formed in each of adjacent regions R4 to R7.

In the present embodiment, the electronic devices such as battery 15 are disposed in regions that are positioned in directions different from the directions in which winding axis O1$a$ and winding axis O1$b$ extend from coils 181 to 184 and that are different from adjacent regions R4, R5, R6, R7.

Specifically, when viewing each electronic device from above electrically powered vehicle 10, rectifier 13, converter 14, battery 15, power control unit 16 and motor unit 17 are disposed at the front side of electrically powered vehicle 10 relative to adjacent regions R4, R5, R6, R7. Camera 33 is disposed at the rear side of electrically powered vehicle 10 to be separated away from each of adjacent regions R4, R5, R6, R7.

It is to be noted that also in the present embodiment, a portion of fuel tank 79 is disposed in adjacent region R3 and a portion of tool containing portion 101 is disposed in adjacent region R4.

Accordingly, also in the present embodiment, the electronic device can be less affected by the electromagnetic field and a dead space can be effectively utilized.

Figure 40:
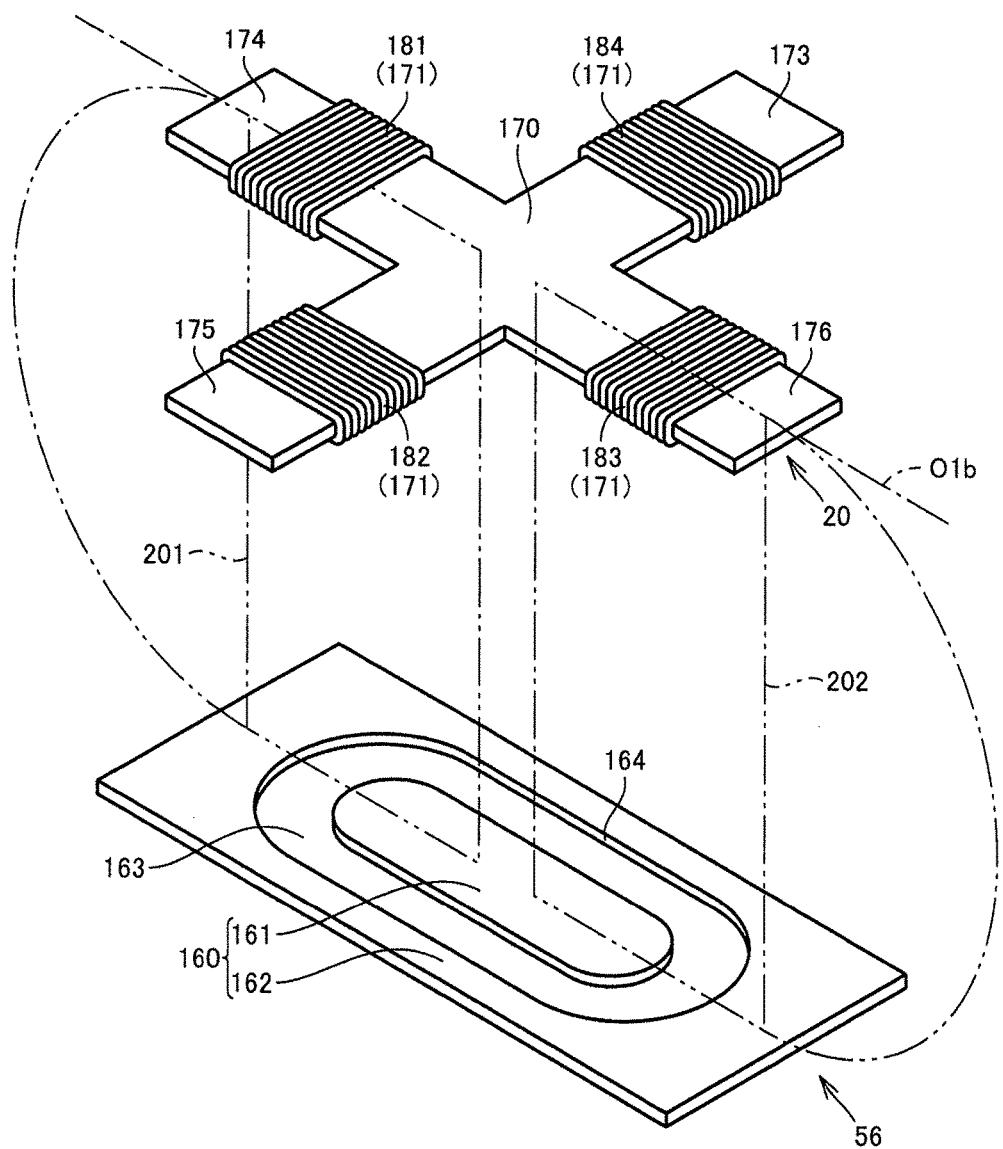
FIG. 40 is a perspective view showing that electric power is being transferred between power reception unit 20 and power transmission unit 56.
Figure 41:
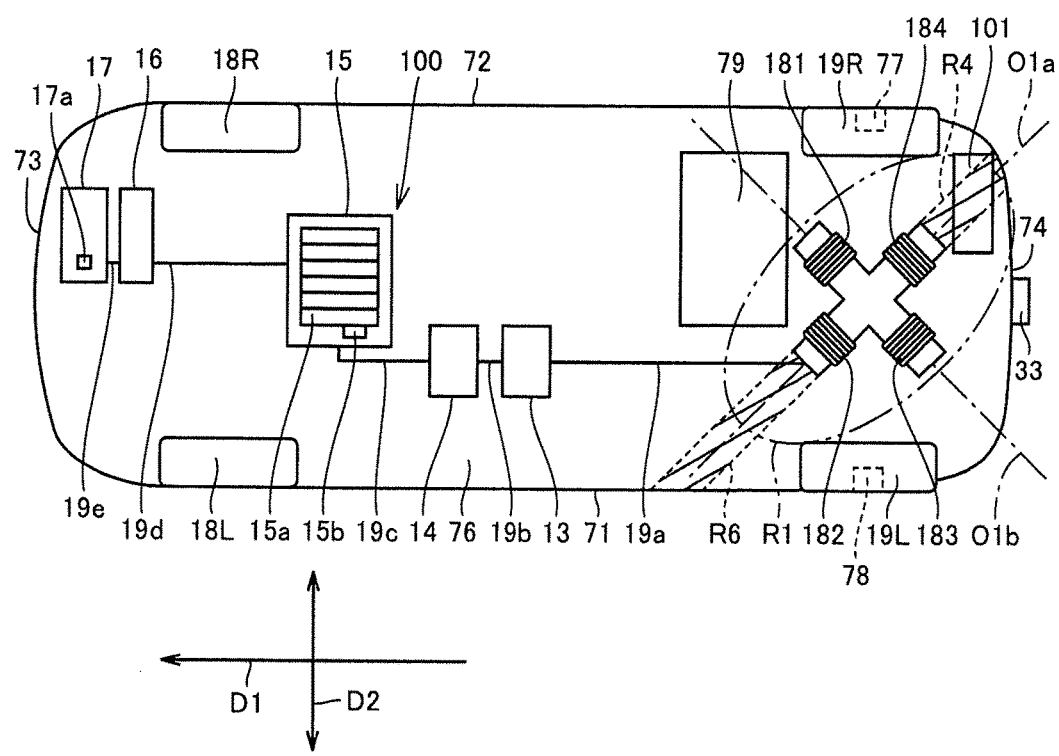
FIG. 41 is a plan view schematically showing a vehicle.

FIG. 40 is a perspective view showing the transfer of electric power between power reception unit 20 and power transmission unit 56. In FIG. 40, power transmission unit 56 includes a ferrite core 160 and a coil 163.

Base portion 162 is formed to have a plate-like shape and includes: a groove portion 164; and a stem portion 161 formed to project upwardly from the central portion of groove portion 164. Coil 163 is wound around stem portion 161.

When transferring electric power between power transmission unit 56 and power reception unit 20 thus formed, current flows in coil 163 of power transmission unit 56.

Accordingly, magnetic paths 201, 202 are formed between power reception unit 20 and power transmission unit 56. For example, magnetic path 202 passes through stem portion 161, the air gap, the central portion of ferrite core 170, the inside of coil 181, the end portion of core piece 174, the air gap, and ferrite core 160. Magnetic path 202 passes through stem portion 161, the air gap, the central portion of ferrite core 170, the inside of coil 183, core piece 176, the air gap, and ferrite core 160.

With the magnetic paths thus formed between power reception unit 20 and power transmission unit 56, large currents flow in coil 181 and coil 183. Accordingly, power reception unit 20 receives electric power from power transmission unit 56.

Here, between core piece 174 and ferrite core 160, the magnetic flux is widely distributed in the direction in which winding axis O1b extends. Likewise, between core piece 176 and ferrite core 160, the electromagnetic field is widely distributed in the direction in which winding axis O1b extends.

In the present embodiment, the electronic devices such as battery 15 are provided at positions away from adjacent region R4 and adjacent region R6, and a portion of tool containing portion 101 is disposed in adjacent region R4.

Fifth Embodiment

Figure 42:
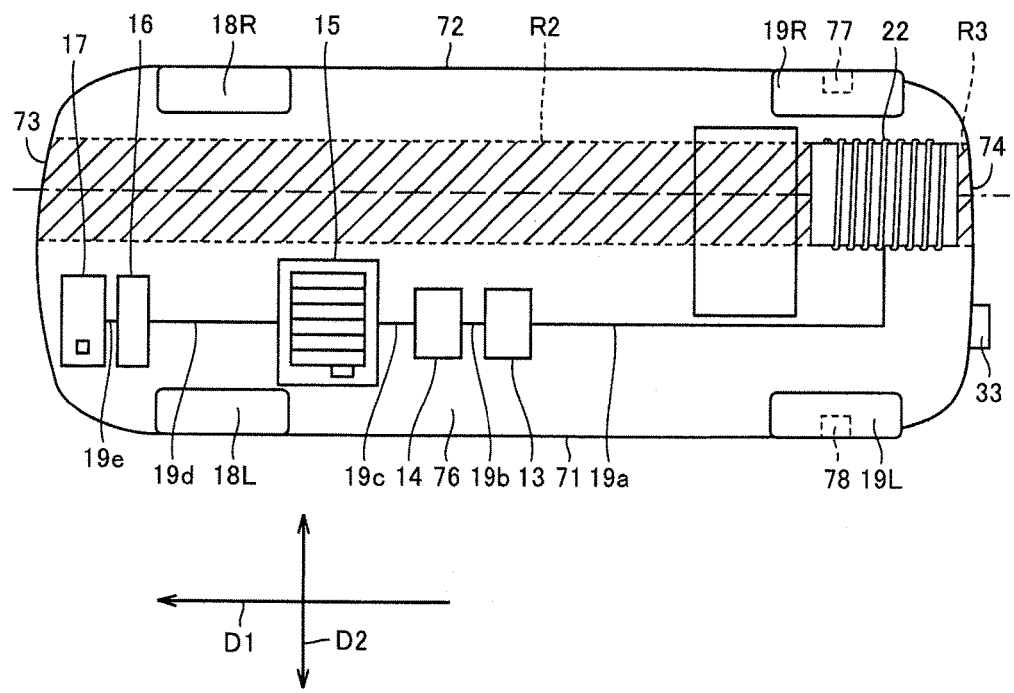
FIG. 42 is a plan view schematically showing an electrically powered vehicle 10 according to a fifth embodiment.

With reference to FIG. 42, the following describes an electrically powered vehicle 10 according to a fifth embodiment. FIG. 42 is a plan view schematically showing electrically powered vehicle 10 according to the fifth embodiment. As shown in FIG. 42, power reception unit 20 is disposed such that winding axis O1 of secondary coil 22 is directed in front-rear direction D1 of electrically powered vehicle 10.

Also in the example shown in FIG. 42, rectifier 13, converter 14, battery 15, power control unit 16 and motor unit 17 are disposed in the regions disposed in the direction different from the direction in which winding axis O1 extends from secondary coil 22. Further, power reception unit 20 is disposed to be offset to the right side surface 72 side relative to the central portion of electrically powered vehicle 10 in width direction D2.

On the other hand, rectifier 13, converter 14, battery 15, power control unit 16, and motor unit 17 are disposed to be offset to the left side surface 71 side relative to the central portion of electrically powered vehicle 10 in width direction D2. Accordingly, rectifier 13, converter 14, battery 15, power control unit 16, and motor unit 17 are disposed in regions different from adjacent regions R2, R3. Accordingly, also in electrically powered vehicle 10 according to the fifth embodiment, the electromagnetic field having high strength can be suppressed from reaching the electronic device.

Sixth Embodiment

Figure 43:
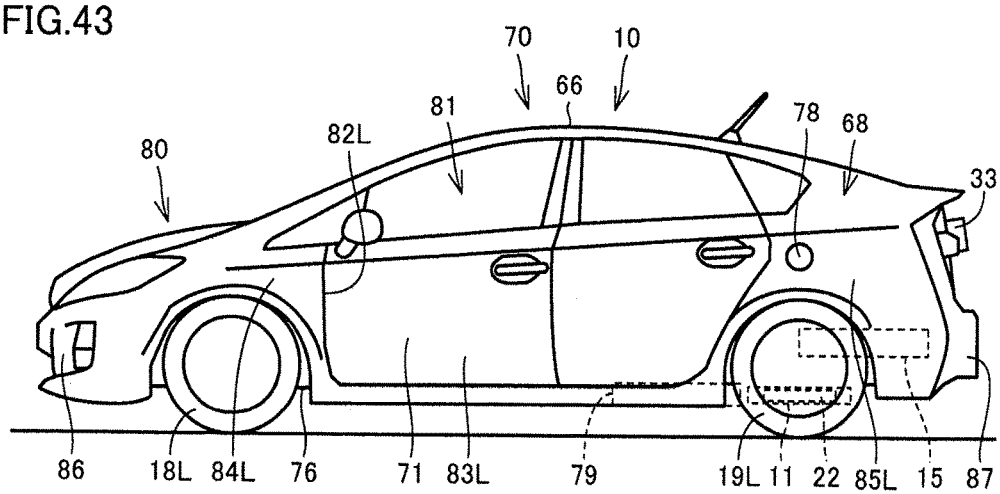
FIG. 43 is a left side view showing an electrically powered vehicle 10 according to a sixth embodiment.
Figure 44:
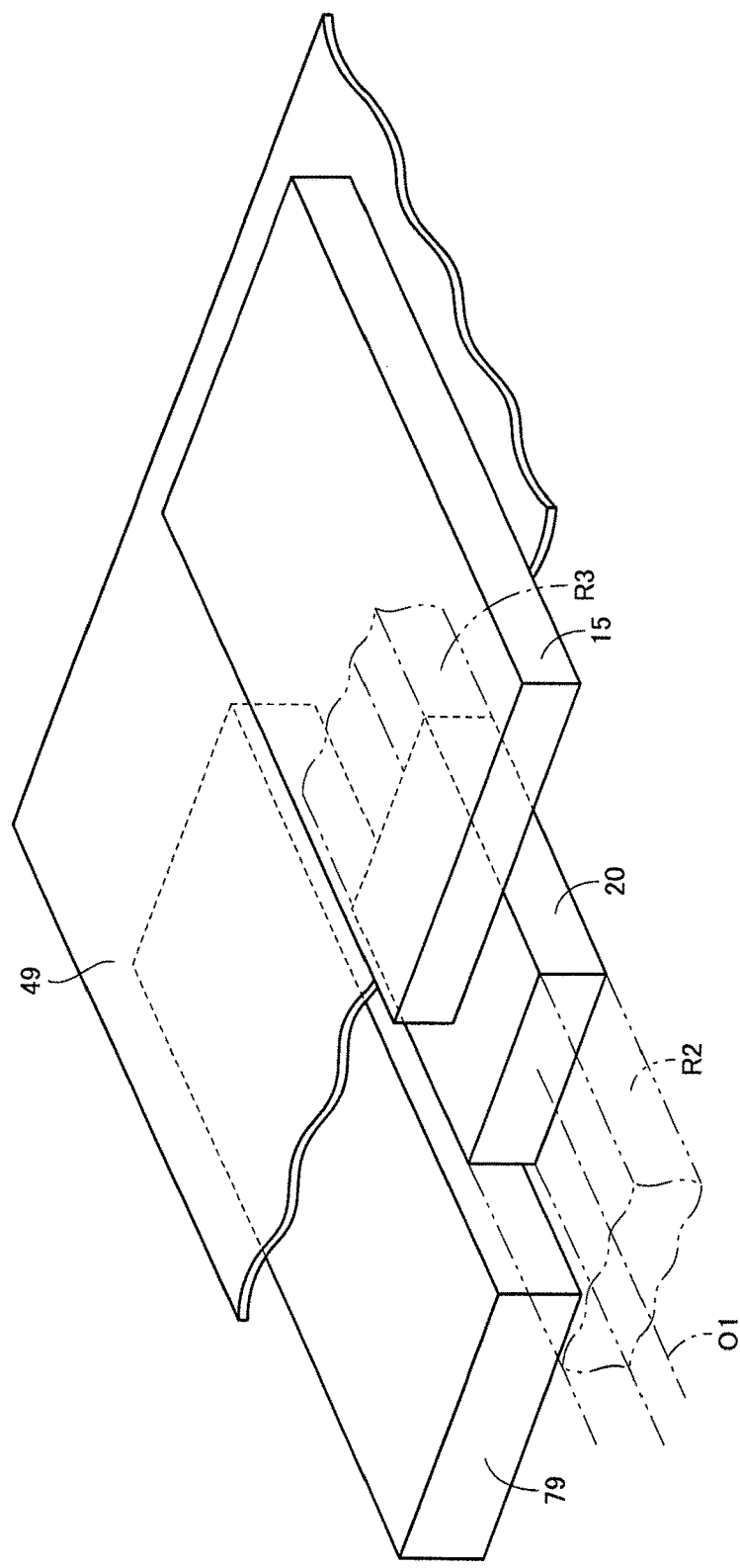
FIG. 44 is a perspective view showing a layout of a battery 15, a power reception unit 20, and a fuel tank 79.

With reference to FIG. 43 and FIG. 44, the following describes an electrically powered vehicle 10 according to a sixth embodiment. FIG. 43 is a left side view showing electrically powered vehicle 10, and FIG. 44 is a perspective view schematically showing a layout of fuel tank 79, power reception unit 20, and battery 15. As shown in FIG. 43 and FIG. 44, fuel tank 79 is provided at the front side relative to power reception unit 20, and battery 15 is disposed above power reception unit 20.

Here, since battery 15 is disposed above power reception unit 20, the region in which battery 15 is positioned is disposed in the direction different from the direction in which winding axis O1 extends from secondary coil 22. Accordingly, an electromagnetic field having high strength can be suppressed from reaching battery 15.

Further, the region in which battery 15 is provided is different from adjacent regions R2, R3, so that the electromagnetic field having high strength can be suppressed from reaching battery 15. Thus, the present invention is not limited to the case where the electronic devices such as battery 15 and adjacent regions R2, R3 are separated from each other in the horizontal direction, and they may be separated in the height direction.

In the present embodiment, battery 15 is disposed on floor panel 49, and power reception unit 20 is disposed at the lower surface side of floor panel 49. Accordingly, the electromagnetic field having high strength can be suppressed from reaching battery 15.

In the above-described embodiments, it has been illustrated that the so-called electromagnetic field resonance coupling or the like is employed, but the present invention can be also applied to a so-called electromagnetic induction type contactless charging method. It is to be noted that an electromagnetic induction coil may be provided to transmit electric power, supplied from high-frequency power driver 54, to primary coil 58 through electromagnetic induction. Further, an electromagnetic induction coil may be disposed to receive electric power from secondary coil 22 through electromagnetic induction and supplies it to rectifier 13.

The embodiments disclosed herein are illustrative and non-restrictive in any respect. The scope of the present invention is defined by the terms of the claims, and is intended to include any modifications within the scope and meaning equivalent to the terms of the claims. Further, the above-described numerical values and the like are exemplary and the present invention is not limited to the numerical values and ranges.

INDUSTRIAL APPLICABILITY

The present invention can be applied to a vehicle capable of contactless power transfer.

REFERENCE SIGNS LIST

10: electrically powered vehicle; 11, 91: power reception device; 13: rectifier; 14: converter; 15: battery; 15a: battery cell; 15b: thermistor; 16: power control unit; 17: motor unit; 17a: photosensor; 18L: front wheel; 19L, 19R: rear wheel; 19a to 19e: interconnection; 20, 96: power reception unit; 21, 57, 126, 140, 150, 160, 170, 185: ferrite core; 22, 58, 92, 94, 97, 99, 121, 122, 123, 124, 142: coil; 23, 59, 95, 98: capacitor; 24, 60: case; 25, 62: shield; 25a: top plate portion; 25b: circumferential wall portion; 26: cover portion; 27, 61: fixation member; 28: bolt; 29a, 29b, 64a, 64b: protrusion portion; 30, 31: insulation piece; 164: groove portion; 33: camera; 34: display unit; 35: first end portion; 36: second end portion; 37, 75: upper surface; 38, 76: bottom surface; 39, 40: side surface; 41, 42: end surface; 43, 45: long side portion; 44, 46: short side portion; 47: side member; 49: floor panel; 50, 90: power transmission device; 51: external power feeding device; 52: parking space; 53: AC power supply; 54: high-frequency power driver; 55, 157: control unit; 56: power transmission unit; 63: cover member; 65: magnetic path; 66: roof; 67: hatch; 67a: upper surface portion; 67b: rear surface portion; 68: luggage compartment; 70: vehicle main body; 71: left side surface; 72: right side surface; 73: front surface; 74: rear surface; 77: refueling portion; 78: charging portion; 79: fuel tank; 79a: main body portion; 79b: auxiliary tank portion; 80: driving compartment; 81: passenger compartment; O1a, O1b, O1, O4, O5: winding axis; O3, O4: imaginary straight line; R1: region; R2, R3, R4, R5, R6, R7: adjacent region; W3, W4, W5: width.

The invention claimed is:

1. A vehicle comprising:
   a power reception unit including a coil that receives electric power contactlessly from a power transmission unit externally provided; and
   a battery,
   an electromagnetic field formed by transfer of electric power between said power reception unit and said power transmission unit being distributed more widely from said coil in a width direction of said vehicle than in a front-back direction of said vehicle,
   the vehicle including one end surface and an other end surface that are arranged in the front-back direction of said vehicle, and a camera disposed at the one end surface,
   the power reception unit being provided at a position on said vehicle that is closer to the one end surface than the other end surface,
   said battery being disposed in a region in said front-back direction of said vehicle from said coil, so as to be provided between said power reception unit and the other end surface,
   a distance in the vehicle longitudinal direction between said power reception unit and said battery is longer than a distance between said power reception unit and the camera.

* * * * *